United States Patent [19]

Putman

[11] Patent Number: 4,500,950

[45] Date of Patent: Feb. 19, 1985

[54] INDUSTRIAL PROCESS CONTROL APPARATUS AND METHOD

[75] Inventor: Richard E. Putman, Penn Hills Township, Allegheny County, Pa.

[73] Assignee: Westinghouse Electric Corp., Pittsburgh, Pa.

[21] Appl. No.: 367,830

[22] Filed: Apr. 12, 1982

[51] Int. Cl.³ .................. G05B 13/02; G06F 15/46
[52] U.S. Cl. .................................... 364/138; 266/80; 364/137; 364/164; 364/176; 432/36
[58] Field of Search ............. 364/137, 138, 139, 157, 364/164, 165, 177, 477, 503, 148, 472; 318/561, 318/621, 622; 266/78, 80, 81, 83, 90, 96, 99; 432/24, 432/36, 37, 47, 51; 431/19, 20, 89

[56] References Cited

U.S. PATENT DOCUMENTS

| | | | |
|---|---|---|---|
| 3,051,462 | 8/1962 | Fennell | 432/4 |
| 3,199,852 | 8/1965 | Koinis et al. | 432/37 |
| 3,533,764 | 10/1970 | Togneri | 364/477 X |
| 3,758,762 | 9/1973 | Littman | 364/149 X |
| 3,772,504 | 11/1973 | Debray | 364/477 |
| 3,860,407 | 1/1975 | Fertik | 65/161 |
| 3,912,912 | 10/1975 | Pollock et al. | 364/148 X |
| 3,947,668 | 3/1976 | Al-Shaikh | 364/137 |
| 4,143,415 | 3/1979 | Klingbell | 364/137 |
| 4,151,589 | 4/1979 | Ross | 364/164 X |
| 4,223,385 | 9/1980 | Miller et al. | 364/477 X |
| 4,255,133 | 3/1981 | Tanifuji et al. | 432/24 |
| 4,276,603 | 6/1981 | Beck et al. | 364/477 |

Primary Examiner—Joseph F. Ruggiero
Attorney, Agent, or Firm—E. Langer

[57] ABSTRACT

The present control apparatus and method for controlling a plurality of intercoupled industrial process operations each having an operation control member. The control member position correction is implemented in accordance with a predetermined characteristic so as to minimize undesired interference with the other industrial process operations.

8 Claims, 8 Drawing Figures

INDUSTRIAL PROCESS CONTROL APPARATUS AND METHOD

CROSS-REFERENCE TO RELATED APPLICATIONS

The present application is related to two concurrently filed patent applications Ser. Nos. 367,828 and 367,831 filed Apr. 12, 1982 by the same inventor, which are assigned to the same assignee as the present application, and which are entitled "Industrial Process Control Apparatus and Method", the disclosures of which are incorporated herein by reference.

BACKGROUND OF THE INVENTION

It is known in the prior art that the control of non-linear combustion process operations such as combustion chamber pressure in boilers, furnaces or soaking pits is influenced by automatic control of the exhaust stack damper position. A piston-type servomotor utilizing compressed air is linked to the damper to control its movement. Many exhaust stacks rely on natural draft to draw the flue gas upward for discharge into the atmosphere. It is the reliance on natural draft only which introduces marked non-linearities in the relationship between the combustion chamber pressure and stack damper position. Contributing to this non-linearity is the resistance to flow introduced by the presence of a recuperator or economizer through which the spent gases pass, for purposes of preheating the air of combustion in the case of a furnace, or for preheating the water in the case of a boiler. Also, the stack draft itself tends to fall as the flow of flue gases increases, because the draft is a function of the flow as well as of the temperature difference between the top and the bottom of the stack. The updraft or suction at the bottom of the stack tends to be reduced for a constant temperature difference as the velocity of the flue gas coming into the bottom of the stack is increased.

The difficulty of controlling combustion chamber pressure in these environments is compounded by the common practice of discharging the flue gases of a plurality of combustion processes through a common stack. This difficulty is because of the tendency toward interaction of the dampers associated with each independent combustion process. An example of these problems is well illustrated by the circumstances of soaking pit operation.

Soaking pits are located in the steel production cycle between the basic oxygen furnace (BOF) where ingots are produced, and the slabbing mill. The BOF produces ingots of steel, either stainless or carbon steel. These ingots sit outside on trucks for a long period and cool off before they are placed in the slabbing mill. The purpose of the soaking pits is to raise the ingots to the desired rolling temperature, and because it takes quite a while for the heat to penetrate through the large tonnage of metal in each ingot, a soaking pit cycle may take eight hours between charging the ingots in the pit and withdrawing them for passage to the slabbing mill.

A typical arrangement would have these pits in batteries of three, with nine such batteries altogether, for a total of twenty-seven pits. The outlet duct from each of the pits in a battery is connected to a common stack provided for the battery of three pits and through which the flue gases are exhausted to the atmosphere. However, each pit has its own damper, which is a hinged, butterfly-type valve, moved by a piston-type servo motor that operates with compressed air. There is always some minimum opening of the pit damper to afford purging of the pit.

In industrial combustion processes, natural draft is commonly relied upon to draw the exhaust gases into the atmosphere, rather than induced draft fans, so that movement of the damper on one pit changes the pressure in the common duct and creates an interaction within the battery of pits as each damper moves in an attempt to maintain the pressure in its respective pit. There can be a constant instability that persists between the three pit pressure control systems, even through the combustion control, which is on the front-end of each pit for controlling the air and gas ratios, works well. Because the differential pressure is higher across their valves, interaction in the control of air and gas is not as significant as contrasted with interactions which take place through the stack.

The exhaust stack arrangement is such that an attempt is made to recover some of the heat going up the stack and transmit it to the input air of combustion through the use of recuperators which preheat the air before it gets to the burners.

The gases from each pit in a given battery flow through a separate exhaust system with its own damper, and a common stack is provided after the individual dampers. The natural draft characteristic of the system is critical in that it changes the normal pressure drop versus flow relationships and the damer position controller gain relationship to flow. Control of the damper position on each pit is very sensitive because the flow rates are not that high and changes in damper position cause changes in draft within a matter of two or three seconds.

The combustion controls associated with each pit respond to the independent variable of temperature which is the product of the combustion process. Temperature in the pit regulates the gas flow, and the gas flow regulates the air flow, and as is commonly found on combustion systems, a cross-coupling and ratio adjustment exists between the air and gas flows arranged so that neither can get out of step with the other while providing a desired fuel quantity and air/fuel ratio.

The control for each damper senses the actual static pressure in the associated pit, and this pressure should be controlled quite closely. If it is too low, or a highly negative pressure, then cold air can be sucked in and the pit cannot properly heat up the ingots. Ingot scaling will also occur. If it is too high, or a positive pressure, the hostile atmosphere within the pit might be blown out into the shop which is both a fire hazard and dangerous to shop personnel.

Conventional pit firing utilizes a modulated firing technique in which the temperature excursions in a temperature versus time profile continuously modulate the fuel gas flow to maintain whatever temperature is specified in the profile for that pit. The fuel gas flow would be fully on when the pit is first started, and gradually tapers off to some very low value as the desired soaking temperature is approached. These pits are not only capable of being fired in the conventional way with modulated firing, but can also be fired with a technique called pulse-firing, with which the pit interactions discussed earlier can become very troublesome.

Pulse-firing creates tremendous disturbances which are not present with modulated firing where there is some trimming taking place all the time. This is because the pulse-firing technique involves firing the pit at full blast to bring it up to desired temperature as quickly as possible. The fuel gas is then cut off completely and the pit cools down slightly, from about 2480° F. to 2372° F. At 2372° F. the fuel gas is turned on again. About 2½–3 minutes later, when the temperature again reaches about 2480° F., the gas is turned off again. The firing operation keeps pulsing up and down like this all the time, with the pulse being simply a complete full blast on or nothing at all. As the soaking condition is approached, the duration of the off time increases because the whole atmosphere surrounding the ingots is hotter and more uniform in temperature, so there is less decay in temperature when the gas is turned off. An indication that soaking temperature has been reached is provided by the increase in duration of the off time to a certain magnitude.

The nature of the pulse-fitting technique is such that it introduces very severe changes in the input fuel gas flow every time the pulse occurs. Thus, the interaction between the pits can become very significant. Clearly, both the magnitude and rate of change in flow are large when this occurs and the effect on the other pits is severe. Further, because the pits are at different stages in their heating cycles, there can be no synchronism in the sequence of pulsing in the respective pits.

The pulse-firing technique has many advantages over modulated firing. Two of the major benefits of the pulse firing technique are improved heat utilization and increased yield of ingots through reduced scale formation. These stem from the fact that the pulse-firing technique exhibits only two states; firing the pit at full bore or not at all. With modulated firing, a very low fuel gas flow requires a lot of excess air to provide the necessary turbulence, which is not very efficient. When firing at full bore under pulse firing, on the other hand, the air/fuel ratio can be adjusted downward so that it is much closer to stoichiometric and nearer to a slightly reducing atmosphere. This also makes the excess air much lower and therefore the ingots do not scale as much leading to a better ingot yield. Overall, pulse-firing is much more efficient in terms of heat utilization.

It can be readily seen that the pulse-firing technique greatly magnifies the aforementioned interactions between the individual pit damper control systems and greatly complicates the operation of any one damper control system. This is because the typical 2,400 pounds per hour of fuel gases which were flowing suddenly stop. The sudden curtailment of fuel gas flow in any particular pit calls for a step change in damper position owing to the sudden increase in natural draft as the affected damper shuts down, and the other pits close in their dampers in response to the sudden increase in draft. There is a tendency for a damper movement on one pit to affect the control of pressure in the others, leading to instability unless the damper position controllers are detuned.

The present invention overcomes these problems, resulting in a control system which exhibits greater stability and higher speed of improved accuracy and response over a 100% load range. This invention has commercial value because of the large number of pits and furnaces to which part or all of the invention applies whether they are operating in batteries or alone. The improved accuracy and response of the system permits the adjustment of the furnace pressure set point closer to atmospheric pressure, to reduce the amount of cold air leaking in through the furnace cover, with an associated saving in fuel gas being provided.

SUMMARY OF THE INVENTION

The present invention relates to the control of a plurality of intercoupled industrial process operations having respective operation control members, such as the control of the combustion pressure within each of a plurality of soaking pits having a movable exhaust gas damper. A control member position is determined for each isolated industrial process operation by a decoupling control apparatus and method which minimizes the undesired interactions between the different industrial process operations in relation to the respective control member positions.

GENERAL DESCRIPTION OF A PREFERRED EMBODIMENT

Figure 1:
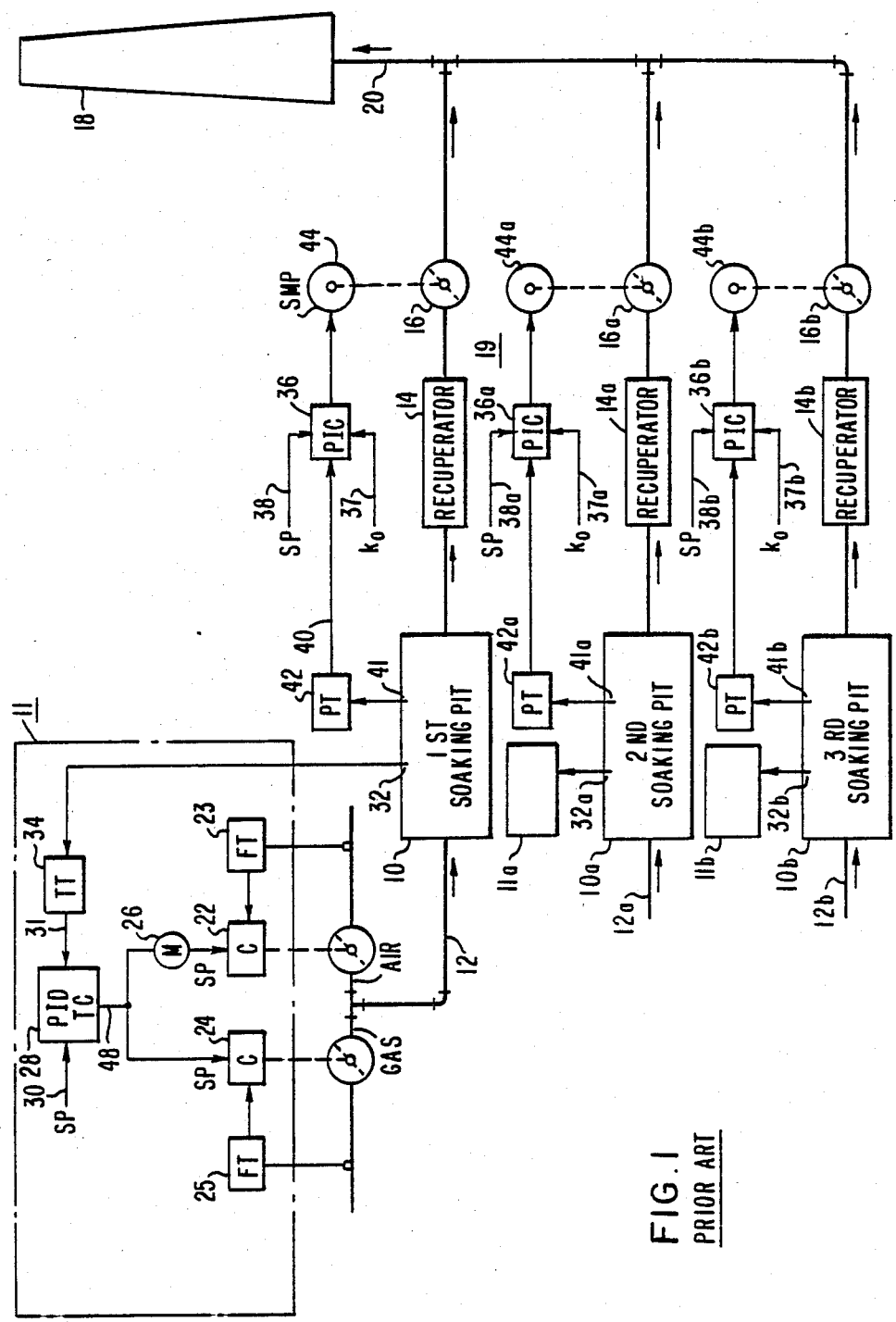
FIG. 1 is a prior art control schematic showing the flue gas path in a battery of three soaking pits beginning with the products of combustion which flow from a soaking pit, through the recuperator, past the pit damper, and into the atmosphere through the exhaust stack.

The non-linear combustion process control apparatus and method in accordance with the present invention is operative to provide an improved operation of the individual pressure control systems associated with each of several combustion processes such as furnaces, soaking pits or boilers, any one of which is equipped with a recuperator or economizer through which spent flue gases pass for discharge into a common stack subject to natural draft. Each pressure control system determines the position of a damper which acts to maintain a desired furnace combustion pressure, and the position of the damper is changed in response to the output of a damper position control program implemented with a microprocessor computer apparatus, with one such microprocessor being applied to control a battery of three soaking pits.

The herein disclosed simulation and analysis of a soaking pit, its flue gas path and pit pressure control system addresses the following process characteristics, which are also common to furnaces and boilers:

(1) The three soaking pits are typically discharged into a common exhaust gas stack, and while each pit is provided with its own damper, the pit pressure control loops exhibit interaction through the common stack due to the sudden changes in flow induced by the pulse-firing associated with each pit.
(2) The availability of only natural or stack draft to pull the exhaust gases from the pits reinforces these interactions and introduces non-linearities in the system.
(3) Large combustion process level changes typically occur over short periods of time presenting the danger that positive combustion chamber pressure will be created during these changes.
(4) The inherent cycle time limitations of a microprocessor create a varying iteration interval which has an effect on control system stability. Also, microprocessor memory space considerations dictate the need for control programs which are compact.

The present invention simulates the flue gas pressure drop in the exhaust train of equipment from the pit, across the recuperators, the duct work and the stack damper. The simulation is incorporated in a control algorithm that anticipates, for a given battery of pits, the position change on at least one other damper if a particular damper is moved. Similarly, the change in position of a third damper produced by the movement of the second damper is anticipated. Resolution of this decoupling before any damper position change is made and related with modification of all damper positions simultaneously, minimizes the undesired pit operation interaction. The control of the three pits as here described by one microprocessor facilitates this decoupling control procedure. The aforementioned resolution for each of pit A, pit B, and pit C is provided by passage through a decoupling matrix to generate the respective resolved damper position outputs which are a synthesis of the three initially desired damper position outputs, and then the individual dampers are moved simultaneously.

The herein disclosed application of the decoupling algorithm acts to minimize the undesired interaction of the individual pit pressure control systems which is introduced by the very severe changes in gas flow inherent in the pulse-firing technique. Implementation of the decoupling algorithm on a microprocessor-based computer accomplishes the purpose of the algorithm through the inherent discontinuities of a logical device. A set of system information is gathered, processed, and that set is passed back again in a processed form.

The decoupling concept is useful in other process applications, such as in steam turbine-generator control and in energy management systems, where several turbo generators with extraction valves, governors, and reducing valves, are applied in a system. Changes made to the control devices associated with any one generator, if made on a serial basis, will cause a response from another generator due to natural feedback and thereby complicate the procedure of trying to bring the whole plant to a new desired steam/power distribution level. For example, to decouple a plurality of devices from one another, the decoupling concept permits assessment of the effect the desired change on any one device will have on the others, so that the resolved desired change for each can be generated and implemented simultaneously on all the devices. In boiler control systems, it is a widespread practice to pass the flue gases from several boilers into a common flue and this creates similar interaction problems where there is a load change in response to a change in process steam demand.

The non-linearity of the behavior of the respective dampers and soaking pits creates the need for a control operation in which both the current damper position and the gain on the damper position controller are adjusted in response to the total amount of fuel being fired. The herein disclosed control operation incorporates a non-linear feed-forward signal and variable gain control operation for accomplishing these adjustments.

DETAILED DESCRIPTION OF A PREFERRED EMBODIMENT

Referring now to FIG. 1, a prior art flue gas path for a battery 19 of three soaking pits is shown. The components associated with the second pit and the third pit, respectively, are designated a and b in FIG. 1 and the description applies to each of the three soaking pits. Each pit includes a pit chamber 10 which is supplied with the products of combustion of coke oven gas 12 at a temperature of approximately 2550° F. and flow rate of approximately 5000 pounds per hour. The exhaust gases are drawn out of the pit chamber 10 at a temperature of about 2200° F. and are passed through a gas/air heat exchanger or recuperator 14 and leave at a temperature of about 1000° F. to pass through an ajustable damper 16 on the way through outlet duct 20 to the stack 18, which stack 18 is common to the battery 19 of three similar soaking pits. The draft condition within the pit 10 is assumed to be −0.1 inches of water, which is increased to −0.727 inches of water leaving the recuperator 14, then leaving the damper 16 further increased to −0.9627 inches of water, reaching −1.1688 inches of water at the bottom of the stack 18. As shown in FIG. 1, each pit has its own damper 16, with the three pits discharging into the outlet duct 20 at sequential points. A prior art combustion control apparatus 11 is shown including two independent controllers (C) 22 and 24 operative with respective flow transmitters (FT) 23 and 25, with the controller 22 being operative with the air control loop and the controller 24 being operative with the fuel gas flow control loop, with a ratio function provided by a multiplier 26 between them to provide a desired fuel to air ratio. Each independent controller derives its set point from a fuel gas demand disturbance signal 48 provided by a master temperature controller (PIDTC) 28 which is controlled by a set point 30 and a feedback signal 31 from a temperature thermocouple 32 and temperature transmitter (TT) 34 operative with the pit. In addition, a prior art damper position proportional plus integral controller apparatus (PIC) 36 is shown which operates from the combination of an externally adjustable root proportional gain ($k_o$) 37, a set point signal 38, and a pressure feedback signal 40 which is fed from a pressure transmitter (PT) 42 and obtained via pressure tap 41 in the pit 10. The controller apparatus 36 outputs to a servomotor positioner (SMP) 44 that mechanically controls the position of the damper 16.

Figure 2:
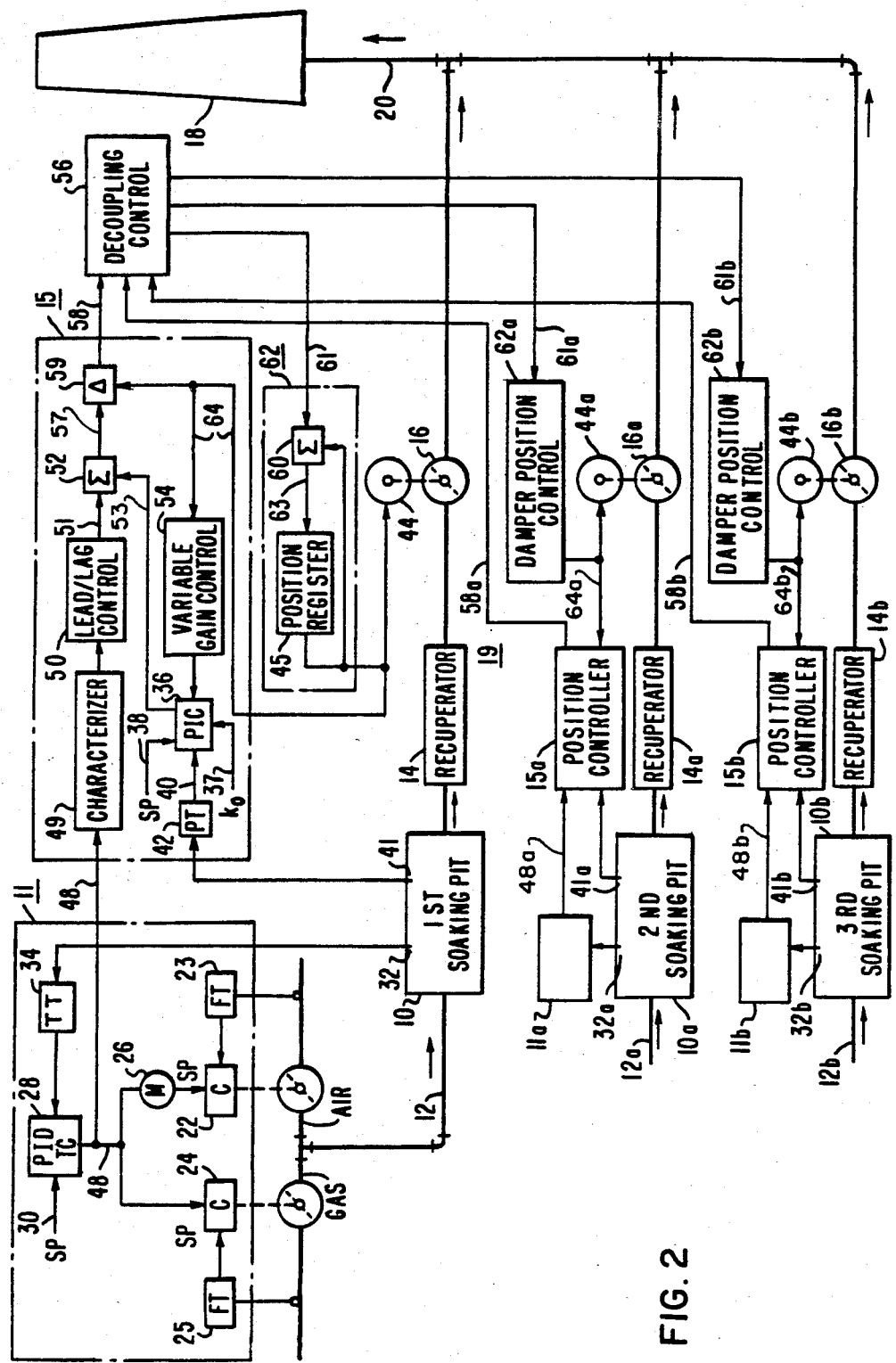
FIG. 2 is a control schematic in accordance with the present invention as applied to a battery of three soaking pits.

In FIG. 2 there is shown a similar battery 19 of three soaking pits, with each pit 10 including a combustion control apparatus 11 similar to the combustion control apparatus 11 shown in FIG. 1. The position controller 15 is supplied in a feed-forward manner with the external disturbance fuel gas demand signal 48 which is passed to a characterizer 49 and is then processed through the lead/lag control block 50 to provide a modified feed-forward signal 51 which is fed to the summer (Σ) 52 at which point the output 53 from the damper position PI controller 36 is added to generate the desired damper position signal 57 which is compared to the present actual damper position signal in comparator (Δ) 59 to generate a desired delta position signal 58 so transforming the output of the combined PI controller and lead/lag control block into the velocity algorithm form. The desired delta position signal 58 is fed to a decoupling control 56 which generates a modified delta signal 61 which is then fed to a summer (Σ) 60 within damper position control 62 and at which point the modified delta signal 61 is added to the present damper position to provide the new desired damper position signal 63, which is used to update the present damper position register 45. The updated position signal 64 is fed to the servomotor positioner 44 for the damper 16. In addition, the updated position signal 64 corresponding to the new actual position of the damper 16 is also fed to a variable gain control block 54 within the damper position control 15, which variable gain control block 54 acts to vary the gain of the damper position PI controller 36 as a function of damper position.

A second soaking pit includes a pit chamber 10a and a recuperator 14a operative through a damper 16a with the common stack 18. The pressure of pit chamber 10a from pressure tap 41a and the feed-forward signal 48a of the fuel gas demand for the pit chamber 10a are supplied to the damper position control 15a. The desired damper position signal is compared to the present actual damper position signal in a comparator to generate a desired delta position signal 58a which is supplied to the decoupling control 56. The modified delta signal 61a is generated and fed to a summer to provide the new desired damper position signal which is used to update the present damper position register within the damper position control 62a. The new actual position of the damper 16a as represented by signal 64a is then fed both to the servomotor positioner 44a and to a variable gain control block 54a within the damper position control 15a which variable gain control block is used to vary the damper position controller gain.

A third soaking pit includes a pit chamber 10b and a recuperator 14b operative through a damper 16b with the common stack 18. The pressure of pit chamber 10b from pressure tap 41b and the feed-forward signal 48b of the fuel gas demand for the pit chamber 10b are supplied to the position controller 15b. The desired damper position signal is compared to the present actual damper position signal in a comparator to generate a desired delta position signal 58b which is supplied to the decoupling control 56. The modified delta signal 61b is generated and fed to a summer to provide the new desired damper position signal which is used to update the present damper position register within the damper position control 62b. The new actual position of the damper 16b as represented by signal 64b is then fed both to the servomotor positioner 44b and to a variable gain control block 54b within the damper position control 15b which variable gain control block is used to vary the damper position controller gain.

Figure 3:
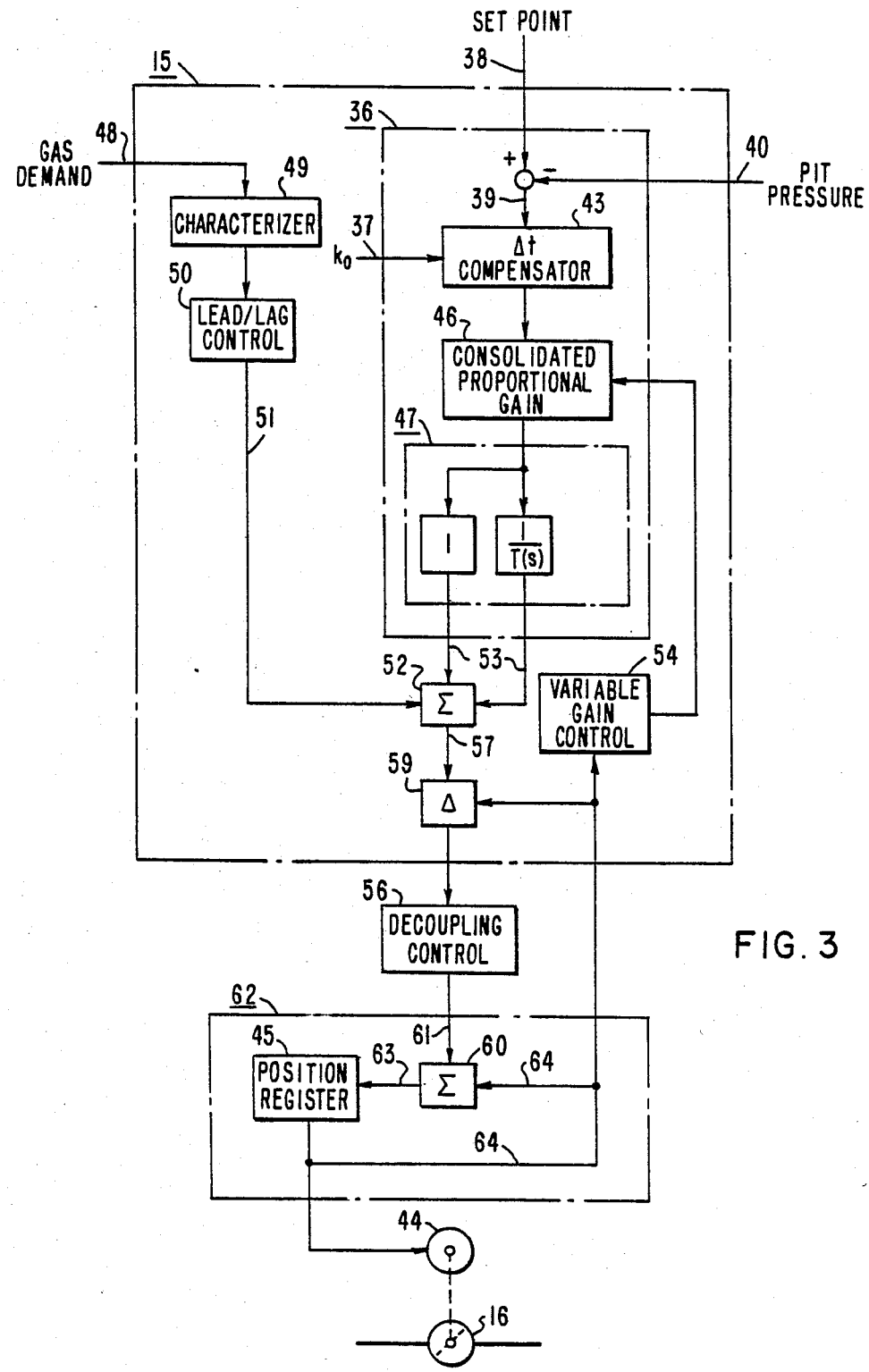
FIG. 3 shows a function block diagram for the damper position control loop apparatus in accordance with the present invention.

In FIG. 3 there is shown a control loop function block diagram which includes the damper position control 15 having a damper position PI controller 36 which is fed by the error signal 39 generated in a node by the comparison of a positive set point signal 38 and a negative pressure feedback signal 40. The position controller 15 is supplied in a feed-forward manner with the fuel gas demand signal 48 which is passed to a characterizer 49 and is then processed through the lead/lag control block 50 to provide a modified feed-forward signal 51 which is fed to the summer 52 at which point the output 53 from the damper position PI controller 36 is added to generate the desired damper position signal 57 which is compared to the present actual damper position signal in comparator 59 to generate a desired delta position signal 58 so transforming the output of the combined PI controller and lead/lag control block into the velocity algorithm form. The desired delta position signal 58 is fed to a decoupling control 56 which generates a modified delta signal 61 which is then fed to a summer 60 within damper position control 62 at which point the modified delta signal 61 is added to the present damper position to provide the new desired damper position signal 63, which is used to update the present damper position register 45. The updated position signal 64 is fed to the servomotor positioner 44 for the damper 16. In addition, the updated position signal 64 corresponding to the new actual position of the damper 16 is also fed to a variable gain control block 54 within the damper position control 15, which variable gain control block 54 acts to vary the gain of the damper position PI controller 36 as a function of damper position.

Figure 4A:
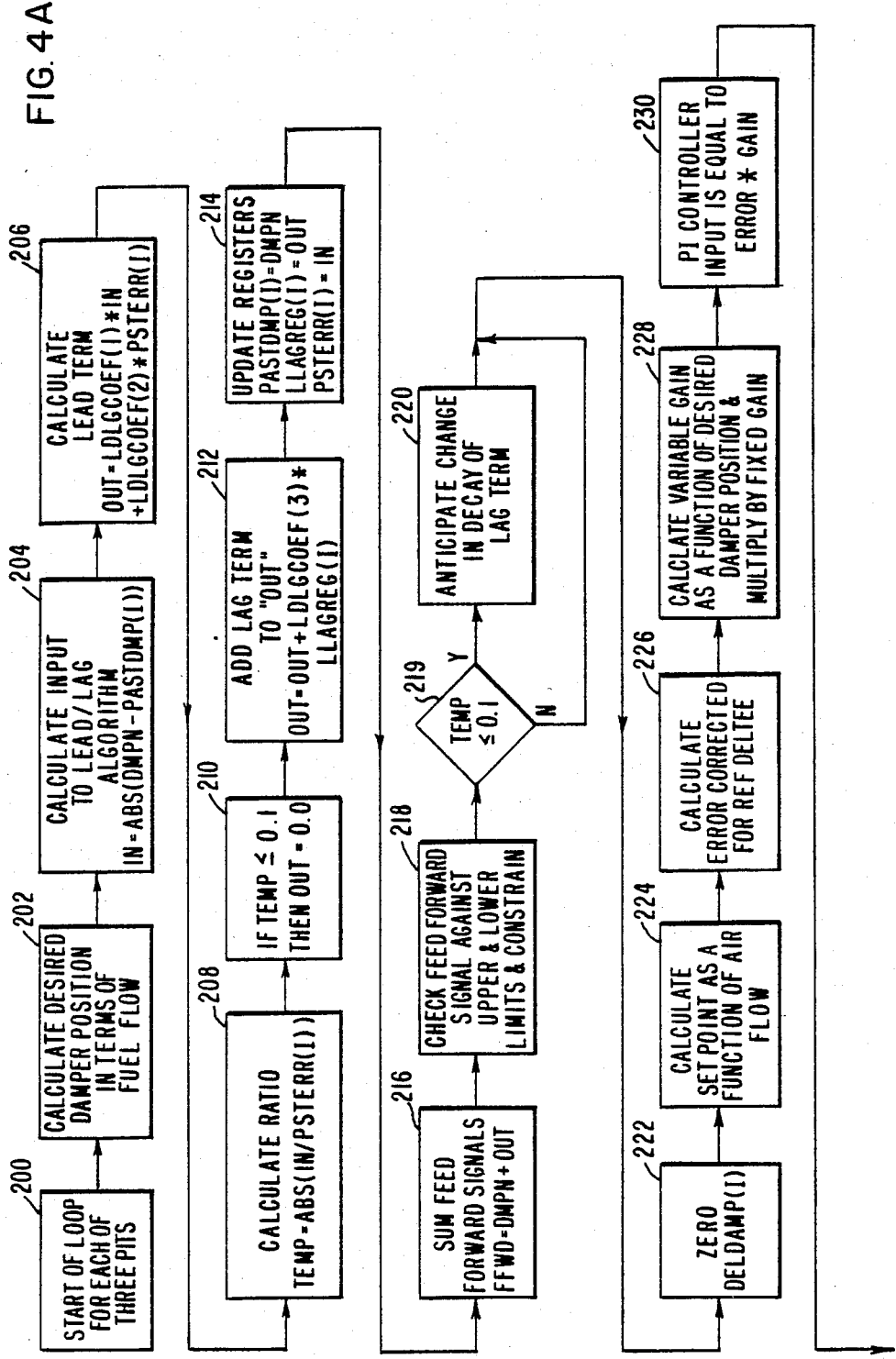
FIGS. 4A, 4B and 4C show a control program flow chart that operationally corresponds with the function block diagram of FIG. 3.
Figure 4B:
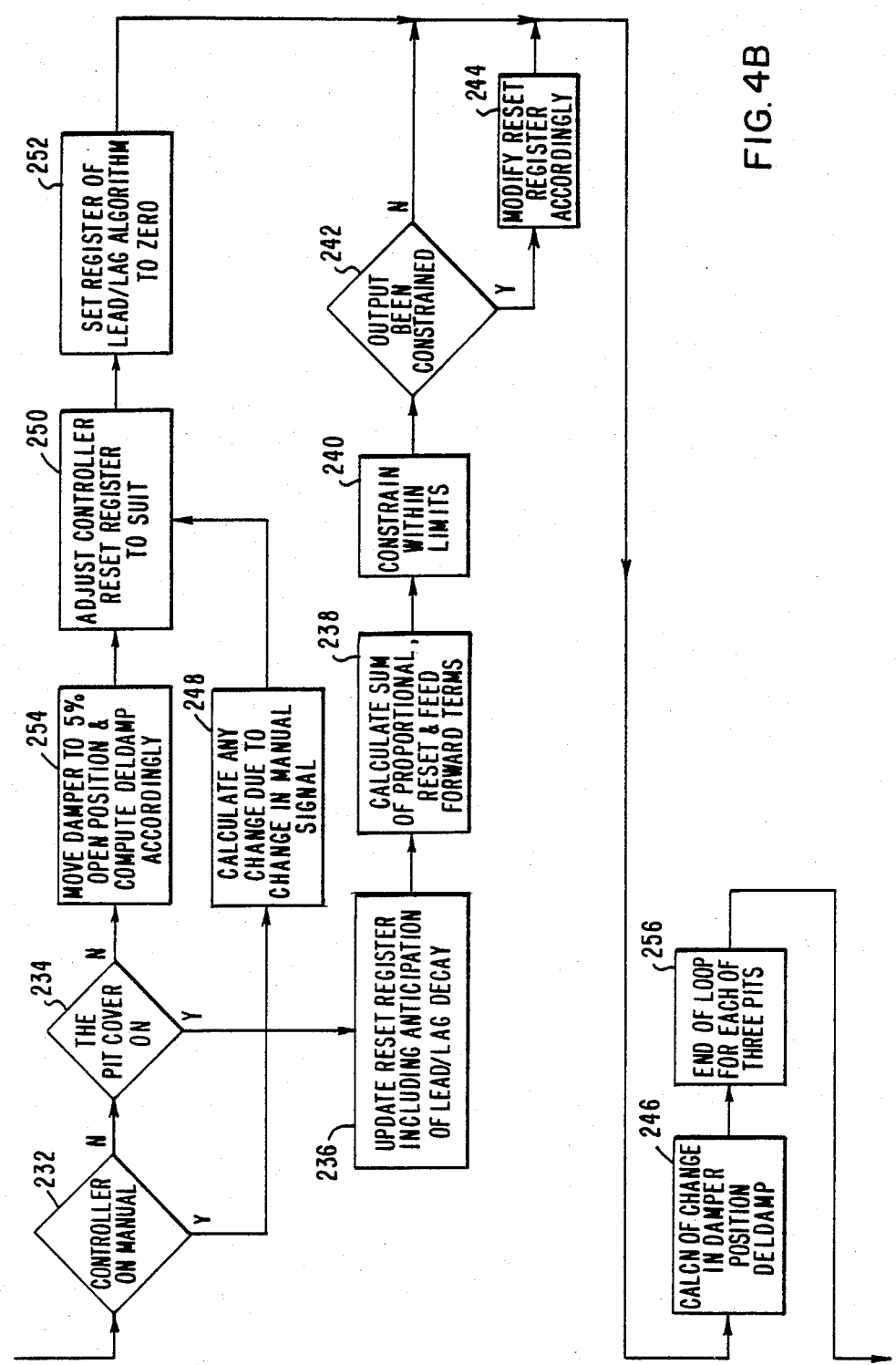
Figure 4C:
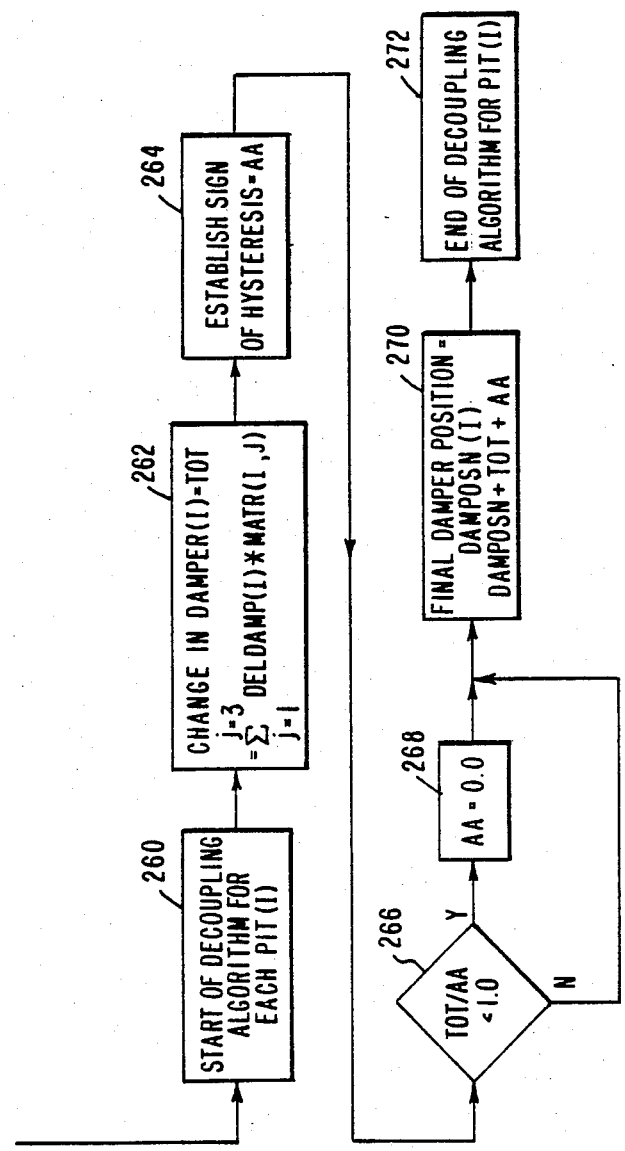

The program flow chart shown in FIGS. 4A, 4B and 4C functionally corresponds with the function block diagram shown in FIG. 3. FIGS. 4A and 4B illustrate the determination of the desired change in damper position for each of three pits, one after the other. Then FIG. 4C illustrates the operation of the decoupling algorithm, with the hysteresis if any being added, such that the final damper position for each pit is determined.

In FIG. 4A, block 200 is the start of the program loop for each of three pits. In block 202 there is calculated the desired damper position in terms of fuel flow, and this is a non-linear function. In block 204 the net input to the lead/lag algorithm is calculated as the absolute difference between the new desired damper position and the desired damper position value calculated at the last iteration of the program. The lead term OUT is then calculated in block 206 taking the value of the input and the past error into account. In block 208 the ratio of the new input to the previous input is calculated, and in block 210 this ratio is less than 0.1; this indicates that the feed-forwad term has ceased to change and has become steady state so the lead term OUT should be made 0, since it should not become negative. In block 212, whatever value the term OUT has become, whether it is equal to the lead term or 0, we add to OUT the value of the lag term. In block 214, the registers used to pass data from one iteration to another are updated. The register PAST DAMP is made equal to the new value of damper position. The register LLAGREG is made equal to the new value of OUT and the register PAST ERROR is made equal to present value IN. The total feed-forward signal is then computed in block 216 and consists of the raw feed foward signal damper position calculated in block 202, plus the output of the lead/lag algorithm calculated in block 212. These two combined form the total feed-forward signal. This is then checked in block 218 against upper and lower constraints to make sure that it lies within the value of 0 to 1 which is the range of the damper position itself. A check is made in block 219 of the value of TEMP, which is a ratio of input to past error determined at block 208. If the value of TEMP is less than 0.1, it means that the reset register of the controller has to be modified as the lag term begins to decay, since there has been reached a steady state operation, and there is no lead term, only a lag term and the decay of the lag term now should impact immediately on the reset register of the controller to avoid the damper being moved unnecessarily during the decay of the lead/lag algorithm. The feed-forward signal should predominate during the steady state situation. In block 220 this anticipation is calculated, and this block forms a termination of the lead/lag algorithm portion of the total pit pressure controller program. Starting in block 222 with the PI controller, the change in damper position is first made 0, and in block 224 the desired set point of the controller is computed as a function of air flow, since leakage through the recuperator requires raising the set point of the pit pressure to reduce the quantity of leakage. The set point tends to rise with total flow through the recuperator, so this is an adjustment to offset recuperator leakage. After computing the set point of the control loop, in block 226 the error difference between the set point and the actual value of the pit pressure is modified for the actual $\Delta T$ which the program is running under, so the correction for $\Delta T$ is applied to the error.

In FIG. 4B, at block 228 the variable gain is computed as a function of the desired damper position and this variable gain is then multiplied by the fixed gain to provide the total proportional gain for the controller. The final input to the controller in block 230 is equal to the corrected error from block 226 multiplied by the total gain calculated in block 228. In block 232 it is determined if the controller is on automatic control, and in block 234 it is determined whether the pit cover is on or not. For a pit under control the cover should be on, and if so at block 236. The reset register is updated including the anticipation of the lead/lag decay calculated in block 220. In block 238, the sum of the proportional, reset and feed-forward terms is calculated and this provides the total desired damper position for a particular pit. In block 240, the combined output is then checked against upper and lower limits and constrained to within a range of 0 to 1, which is the full range of damper position. In block 242 if the output has not been constrained, the flow sheet moves forward to the end of the do loop, if the output has been constrained, then in block 244 the reset register must be modified to take account of the constraining. At block 246 the change in damper position between this iteration and the previous iteration is calculated for each pit.

If the controller is on manual at step 232, then in block 248 there is calculated any change due to a change in manual signal which the operator has imposed, such that if the operator has the damper position control on manual and has changed the damper position, it is necessary to take that change into account. In block 250, the controller reset register is adjusted to match the manual signal so that a bumpless transfer can be made when next going back to automatic control. In block 252 the register of the lead/lag algorithm is set to 0 to again provide bumpless transfer from the state the system is in at the moment to switching at a later time from manual to automatic.

If at block 234 the pit cover is off then the pit ought to be shut down, and in block 254 if the cover is off the damper is moved to the 5% open position, since there must be some minimum opening to make sure that the fuel gases can escape from the pit and then proceed to block 250.

The program operation so far described in relation to FIGS. 4A and 4B is repeated three times, once for each pit, and the output at bock 256 is the total desired damper position as the sum of all of these different components.

The program shown in FIG. 4C follows block 256 and is the decoupling algorithm. Having established the desired change in damper position for each pit, the decoupling algorithm provides the resolved change in damper position for each pit, taking interactions into account. Block 260 is the start of the decoupling algorithm for each pit. At block 262 the resolved change in damper position TOT is set equal to the sum from j equals 1 to j equals 3 of the product of the change in damper position times the matrix (I, J). In block 264 the magnitude of a hysteresis effect is inserted into the code. If the ratio of the change of damper position to hysteresis at block 266 is less than unity, the hysteresis effect is set to 0 in block 268. This implements the change in damper position that was already calculated. Otherwise the hysteresis effect AA is retained. From the resolved change in damper position, a step 270 the final damper position is calculated in terms of the previous position plus the effect of hysteresis plus the resolved change.

DESCRIPTION OF FEED-FORWARD/LEAD-LAG CONTROL OPERATION

In FIG. 2, a modified feed-forward signal 51 is provided in which the desired damper position is estimated in accordance with the fuel gas demand signal 48 representing the quantity of fuel gas that is being fired. The feed-forward mode is used to adjust each pit damper in accordance with the major changes in fuel gas flow.

Feed-forward involves the anticipation of a change in related parameters, such as fuel and air flow, which will eventually impact the combustion chamber pressure. The pressure is a feedback signal, but air and fuel flow determine a feed-forward signal because they will take place before the change in pressure has occurred. The feed-forward characteristic is a prediction of the damper position corresponding to the new flue gas flow and is affected by the non-linearity of the particular process system characteristics. Non-linearity, while not as marked with an induced draft system as in a natural draft system, is always a factor. The characteristics of the damper position versus flow equation given in (3) below are developed by the regression anaylsis of fuel flow versus damper position data obtained under steady-state conditions over a wide range of flows. The characterizer 49 is a piece of firmware which contains this equation.

There is included an absolute lead/lag algorithm which operates on the fuel gas demand signal 48 to provide the modified feed-forward signal 51 which ensures that each damper is open more than is needed during transient conditions of the combustion chamber pressure to provide a safety feature that prevents the flue gases from blowing out into the shop generally and creating a dangerous situation for a human operator. This is a different kind of algorithm from that which is commony used in an ordinary lead/lag context such as that of a compensator on a feedback signal which assumes a sinusoidal and continuous input disturbance. In the case under consideration, the process disturbance is monotonic, not sinusoidal, and the standard Laplace lead/lag function is not suitable for the desired control operation because it decays too quickly when the change ceases. Also, the standard lead/lag algorithm designed for use in the feedback mode reverses in its behavior when a negative rate of change is detected in the signal which it receives. For these reasons it is inappropriate for use in the feed-forward mode where the object is to have a lead/lag contribution which is always positive and decays gracefully once the signal approaches steady state. The present invention addresses these problems by including a feed-forward lead/lag algorithm which features maintenance of the lead component until after the change has ceased, at which point the lag component or decay commences. Another feature is the positive nature of the output under all conditions.

As the fuel flow increases, the modified feed-forward signal 51 operates to achieve the desired position of the damper 16 in anticipation of the increased flow. The lead/lag feature of the modified feed-forward signal 51 operates to make the damper position change such that the change is more than is otherwise necessary, tending to create a negative pressure during the resulting transient condition of operation. Similarly, when the fuel flow drops, the controlled closing movement of the damper 16 will lag behind the fuel, again creating more suction than is really needed during the resulting transient condition of operation. The modified feed-forward signal 51 attempts to establish new system equilibrium with some precision. However, because the equilibrium based on only the modified feed-forward signal 51 is not absolutely precise, the summer 52 adds to it the output 53 of the damper position PI controller 36 which, because it is fed from the pressure transmitter 42 monitoring the internal pit pressure, will integrate out any resultant error that might persist in the latter pressure during the steady-state operation after any transient has died away.

To anticipate the required damper position change corresponding to an increase in the rate of fuel firing, the lead/lag network incorporates a lead/lag algorithm having the basic transfer function as follows:

$$\frac{C(S)}{R(S)} = \left| k \cdot \frac{1 + T_1 S}{1 + T_2 S} \right| \quad (1)$$

where C(S) is the controlled variable and R(S) is the reference variable, $T_1$ is the lead time constant, $T_2$ is the lag time constant and k is the gain.

The value of the modified feed-forward signal 51 is added to the output 53 of the PI Controller 36 in line 158 of the control program listing included in Appendix A. However, in the past, the rapid decay in this value with constant input has caused an unnecessary change in the position of the damper 16 which must be integrated out through the PI algorithm of controller 36, to restore equilibrium. One improvement of the present invention is to correct the reset register of the PI algorithm of controller 36 internally by the amount of the decay in the lead/lag algorithm output immediately as it is calculated, to avoid the controller 36 unnecessarily disturbing the damper.

DESCRIPTION OF VARIABLE GAIN CONTROL OPERATION

For purposes of operating the damper position control system, the desired relationship is the change in damper position for a change of pressure, which relationship cannot be derived directly, so it is derived indirectly from a combination of relationships that can be measured. One of these is the relationship between a change of pressure in the pit and the change of input mass flow for a constant stack draft and fixed damper position. The other relationship is the change in damper position for a change of input mass flow, or the feed-forward characteristic. The product of the transferred partial differentials in each of these relationships determines a third relationship which is the change of pressure to the change of damper position. Because the change of pressure is caused by the change of damper position which, in turn, is caused by a change of pressure, this third relationship becomes the system gain.

The non-linearities in flue gas flow introduced by the resistance of the recuperator or economizer and the reliance on natural draft create the need for the variable gain feature which acts to obtain a constant system gain over the whole range of system operation. Reliance on natural draft introduces non-linearities in the flow because with natural draft, for an increase in the flow of flue gases the draft tends to fall. The draft is a function of the temperature difference between the top and the bottom of the stack and the velocity of the flue gases. The up-draft inherent in a rising column of hot air tends to create a low pressure at the bottom of the stack. The draft or suction at the stack bottom tends to be reduced, for a constant temperature difference, as the velocity of the flue gas flowing into the bottom of the stack increases so as to increase the pressure at the bottom. With natural draft, the suction tends to decrease with increased flue gas flow, as compared with an induced draft fan application, where the suction tends to increase with increased flue gas flow as the fan speeds up to force the increase in suction.

Application of control theory stability criteria dictates that the system gain, which is the product of the disturbance gain and the controller gain, should be unity or less. The partial differential derived from the damper pressure relationship, or dD/dP, is the variable gain of the damper position controller. When the combined damper position controller gain is multiplied by the predicted process response as reflected by the partial differential dP/dD, the overall system gain should be less than unity. Thus, $$[\text{controller gain}] \cdot [\text{process gain}] = $$

$$\left[ \left( \frac{dD}{dP} \cdot k_o \right) \left( 1 - \frac{1}{T(s)} \right) \right] \cdot \left[ \frac{dP}{dD} \right] \leq 1$$

where $(1 + 1/T(s))$ is the Laplace transfer function 47 for a PI controller, $(dD/dP \cdot k_o)$ is the consolidated proportional gain 46, and $k_o$ is the root proportional gain 37.

Because the root proportional gain of the damper position controller is a value which can be set externally, the overall system gain can be determined. In the present invention there is a variable gain which is a function of the actual damper portion. The more open the damper becomes, the larger the controller gain becomes because the change of damper position for a given change of pressure has to become greater. This is because the stack draft is decreasing with increased flue gas flow, and a greater change in damper opening is therefore required. As the flow increases, the damper must be moved more to get the same change of pressure in the pit.

Analysis of the flow relationship on an empirical or theoretical basis reveals that the gain on the system has a very non-linear characteristic. The method of theoretical analysis is now described.

The herein disclosed theoretical plant model was exercised in the control program listing of Appendix A, eliminating the effect of flow differences on pit pressure and, assuming a constant value for stack draft ($-1.1688$ inches H$_2$O) and pit pressure ($-0.1$ inches H$_2$O), i.e., establishing an equality between input mass flow and flue gas flow. The flue gas flow W through the recuperator/damper/stack system was thus established over the range of damper position D of 10% through 100% and the flow/damper position relationship is plotted in curve 96 in FIG. 5. The curve relates the independent variable, flud gas flow (or mass flow in lb./hr.), to damper position. Regression of the data from which this curve was plotted gives the equation:

$$D = 0.17742E - 0.74227E - 7W^2 + 0.14334E - 10W^3 \quad (3)$$

The flue gas flow equation was also regressed from this curve, and indicates that gas flow is a function of the damper position. Thus, $$W = -30.66 + 1.4249E + 04D - 1.390 - 74E + 04D^2 + 4932D^3 \quad (4)$$

Thus, the partial differential of this relationship is:

$$\frac{\Delta W}{\Delta D} + 1.4249E + 04 - 2(1.39074E + 04D) + 3(4932.0D^2) \quad (5)$$

Figure 5:
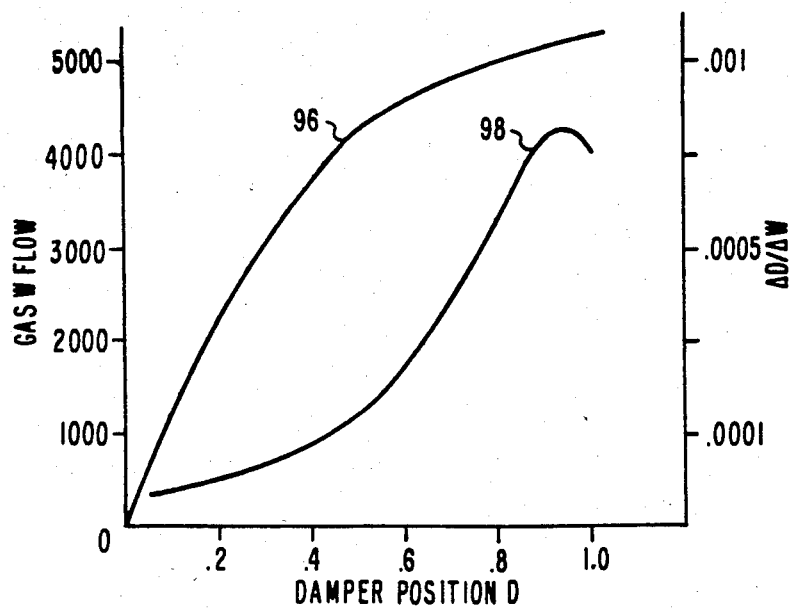
In FIG. 5, the upper curve shows the flue gas flow as a function of damper position and the lower curve shows the partial differential of this relationship; and In FIG. 6, the upper curve shows a plot of the partial diffential of flue gas flow with respect to pit pressure, and the lower curve shows the change in damper position corresponding to the flow produced by a change in pit pressure.

Curve 98 in FIG. 5 plots the inverse of this relationship, $\Delta D/\Delta W$, and indicates by how much the flow into the pit should change to correspond to a change in damper position.

Figure 6:
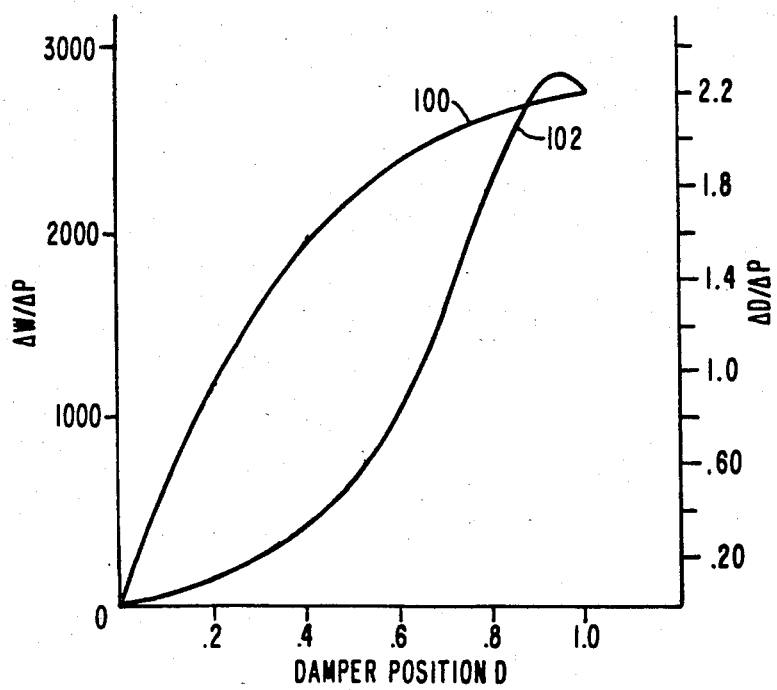

For varying damper positions over the range 10% to 100%, the flows with pit pressures of $-0.1$ inches H$_2$O and zero inches H$_2$O respectively were established and the partial differential of flue gas flow with respect to pit pressure, $\Delta W/\Delta P$, is plotted in curve 100 of FIG. 6 and defined by the flow/pressure relationship:

$$\frac{\Delta W}{\Delta P} = -23.82 + 7265.6D - 6785.2D^2 + 2294.9D^3 \quad (6)$$

For purposes of establishing a soaking pit combustion pressure control system, a key part in the analysis of soaking pit operation is the establishment of the damper/pressure relationship. The forward gain associated with the tuning of a PI controller may be defined as the change in damper position corresponding to the flow produced by a change in pit pressure. This is obtained by taking the two partial differentials, both in terms of damper position D, and dividing them. Thus, the damper/pressure relationship is:

$$\frac{\Delta W}{\Delta P} \bigg/ \frac{\Delta W}{\Delta D} = \frac{\Delta W}{\Delta P} \cdot \frac{\Delta D}{\Delta W} = \frac{\Delta D}{\Delta P} \quad (7)$$

Curve 102 in FIG. 6 is the damper/pressure relationship, or change of damper position for a change of pressure. The primary stimulus in the system is a change of pit pressure, or furnace pressure, which through the controller produces a change in damper position.

By evaluating the rather complicated expression of equation (7) for various values of D and plotting the results, curve 102 in FIG. 6 can be obtained. By regressing this curve, the variable gain is found:

$$\frac{\Delta D}{\Delta P} = -2.74228E - 02 + 0.161417D + 2.3433D^2 \quad (8)$$

Clearly, this must be constrained to some low value greater than zero if the controller is to continue to function. It must also never reverse in sign.

In order to incorporate the adjustable tuning constant $k_o$ in previous equation (2), the above expression must be modified as follows to establish the consolidated proportional gain:

$$GAIN = [-2.74228E - 02 + 0.161417D + 2.34333D^2] \cdot k_o \quad (9)$$

The purpose of the foregoing analysis is to identify that in a non-linear system, the damper/pressure relationship can be developed as shown in equation 7. This relationship is strikingly non-linear and it is clear that a variable gain control 54 would be desirable, the gain being varied as a function of damper position.

DESCRIPTION OF COMPENSATION CONTROL OPERATION FOR ITERATION INTERVAL VARIATIONS

The damper position PI controller is implemented in a programmed microprocessor. With a fixed iteration interval, the reset time constant can be adjusted to achieve system stability. However, because the microprocessor duty cycle may change, the actual iteration interval ($\Delta t$) may be subjected to unwanted changes. The PI controller will not exhibit the right behavior unless such changes in the actual $\Delta t$ are compared to the reference $\Delta t$ and a compensating adjustment is made by modifying the basic Laplace transfer function for the overall controller gain. In the herein disclosed PI controller, with a base or reference iteration interval of a quarter of a second, for example, if the actual iteration interval slips to one second, the gain will be decreased in a compensating fashion by $\Delta t$ compensator 43 to maintain former system stability.

The stack damper simulation as incorporated in the control program listing of Appendix A was exercised with a proportional only controller, the reset time constant being set to 10,000. The gain on the control loop was then increasd in steps until the loop became unstable. The associated gain and loop natural frequency S were then noted as 2.09 and 2.5 sec. respectively.

A common rule of thumb (see Rutherford, C. I., The Practical Application of Frequency Response Analysis to Automatic Process Control, Proc. Inst. Mech. Eng., Vol. 162, No. 3, pp 334-343, 1950) is to divide the gain (G) that produces instability by $\sqrt{e}$ to obtain $k_o$, the gain for a damped oscillation thus:

$$k_o = G/\sqrt{e} \quad (10)$$

The reset time constant may be established by assuming that the controller is to have a 9° phase lag $\phi$. The reset time constant T can be computed from the relationship:

$$\frac{T}{S} = 2\pi \tan\phi \quad (11)$$

For $\phi = 9°$, $T/S = 0.995$ or close to unity. The above rule of thumb was evolved in the course of the tuning of analog control systems in which the iteration interval $\Delta t$ approaches zero. Where $\Delta t$ has a finite value which is large compared to the time constant of the plant, it has become apparent that the effective gain of the system is proportional to the value of $\Delta t$. This is not unexpected in a sampled data system in which the change in pressure is proportional to the product of time and the difference between pit inlet and outlet flows.

A common DDC algorithm for a PI controller having the transfer function:

$$\frac{C(S)}{R(S)} = k_o \left[ 1 + \frac{1}{T(S)} \right] \quad (12)$$

can be expressed in this case in its sample data form as:

$$\frac{C(S)}{R(S)} = k_o \left[ 1 + \frac{\Delta t}{T} \right] \quad (13)$$

The normal transfer function for a PI controller can be applied to express the change in damper position for a given change of pressure coming into the controller. Thus, $$\frac{\Delta D}{\Delta P} = k_o \left[ 1 + \frac{\Delta t}{T} \right] \quad (14)$$

The iteration interval is represented by $\Delta t$ which corresponds to the sampling time. Use of a reference $\Delta t$ of a quarter of a second or less allows the sample data algorithm to approximate the theoretical relationships.

If the reference iteration interval is chosen to be 0.25 seconds for a specific process control application, and the gain and reset time constants are established accordingly, then for uniform dynamic behavior of the control loop regardless of the value of the actual iteration interval $\Delta t$, (14) should be modified as follows:

$$\frac{\Delta D}{\Delta P} = \frac{0.25}{\Delta t} \left[ k_o \left[ 1 + \frac{\Delta t}{T} \right] \right] \quad (15)$$

or $$\Delta D = \frac{\Delta P * 0.25}{\Delta t} \left[ k_o \left[ 1 + \frac{\Delta t}{T} \right] \right] \quad (16)$$

In this way the control loop settings can be established in a rational manner and automatically compensated for variations in the actual controller execution interval. As the rationale for this innovation the following explanation is offered. Equation (15) can be rewritten in the form:

$$\frac{\Delta D}{\Delta P} = \Delta t_{REF} \left[ \frac{k_o}{\Delta t} \left[ 1 + \frac{\Delta t}{T} \right] \right] \quad (17)$$

In a system containing a first order process lag, a given difference in flow rates will produce a response in the form of a pressure change which is directly proportional to the time of duration. Thus by adjusting $k_o$, the experimentally determined root proportional gain or tuning constant, by the ratio $\Delta t_{REF}/\Delta t$, the effect on system gain remains constant regardless of the value of $\Delta t$.

The ability to automatically modify $k_o$ is important in systems where the value of $\Delta t$ cannot be assured, such as where a microprocessor with a high duty cycle might slip. If, in the course of slipping, the same dynamic behavior is maintained, the stability of the control is improved regardless of changes in the iteration interval.

DESCRIPTION OF DECOUPLING CONTROL OPERATION

Each damper position control system is operationally independent until the desired change in damper position is generated. Before that change is implemented, the desired change in the other two damper positions is calculated. Having established by how much each damper position should change in order to maintain its own pit pressure, the effect on the other pits is evaluated. The coupling here is different from pit to pit because of the way in which the flue gas ducts are connected and the pressure drops existing therein. A net change is generated through a simultaneous equation, and the resolved desired change is added simultaneously to the present position on each pit damper. Otherwise, if these changes are made one at a time, they will react undesirably with each other by disturbing each other's pit pressure controller unnecessarily. By anticipating the undesired interactions and implementing the resolved desired changes all at once, such interactions are minimized. The algorithms used for the control of each damper position are exercised once per second.

The diagram of FIG. 2 shows a decoupling control 56 incorporating a decoupling algorithm. Whenever, the damper on any one pit opens, the volume of gas leaving that pit will increase, as will the stack flow loss however. The associated reduction in net stack draft will also affect the flows from the other pits and cause their dampers to tend to open slightly in response; but with some lag, which can cause inter-loop instability if the interaction is sufficiently large. To avoid this occurring the following decoupling algorithm is used, which takes the estimated damper position change associated with each pit, resolves these, and passes back a resolved change to each damper position servo motor. The decoupling algorithm looks at the effect that any individual desired damper position change will have on the other pit dampers. Once these are resolved, it is the resolved changes that are actually used to shift the damper positions.

The decoupling algorithm shown in lines 181–191 of Appendix A is organized so that the desired change in damper position $\Delta D_i$ for each of the 3 loops is first calculated. Knowing the interaction factor between each pit, the coupled changes in damper position $\Delta D_i^*$ may be calculated as follows:

$$\Delta D_1^* = k_{11}\Delta D_1 + k_{12}\Delta D_2 + k_{13}\Delta D_3$$

$$\Delta D_2^* = k_{21}\Delta D_1 + k_{22}\Delta D_2 + k_{23}\Delta D_3$$

$$\Delta D_3^* = k_{31}\Delta D_1 + k_{32}\Delta D_2 + k_{33}\Delta D_3 \quad (8)$$

It should, be noted that $k_{11}$, $k_{22}$, and $k_{33}$ are all unity. The resultant change in damper position, array V, can be calculated as follows:

$$V_i = V_{i-1} + \Delta D_i \quad (9)$$

And the reset registers R can be readjusted so as to be equal to:

$$R_i = V_i - GAIN_i \cdot ERR_i \quad (20)$$

It is seen that the code multiplying a 3×3 matrix by an array is very short and should have little impact on microprocessor duty cycle. The decoupling effect can be eliminated by making matrix MATR in line 187 an identity matrix.

Some pit dampers are very large and the servo mechanism and linkage combined can exhibit hysteresis to small signal changes. To offset this, a small hysteresis factor HYST has been introduced in line 188 which, added to the desired position in line 191, can ensure that this hysteresis is offset.

The velocity algorithm has been used to permit the decoupling feature to be included. It has however been coded in lines 133–146 as an absolute position algorithm, the output from which is then subtracted from the previously calculated output to provide the new desired change in damper position. Note that all control loops must be calculated before the decoupling algorithm is applied.

DESCRIPTION OF PLANT MODEL

The plant model of the flue gas path including the pit chamber 10, the recuperator 14, the damper 16 and the common stack 18 as shown in FIG. 2 may be defined mathematically as shown in the program listing in Appendix A and as follows, in terms of the driving force for the system, i.e., pressure. Each of the model constants is then evaluated based on stated assumptions.

For the purpose of control system simulation, it will be assumed that the pit 10 is provided with a leak-free cover.

Let
$W_I$ = flow of gases into pit lb/hr
$W_o$ = flow of gases leaving pit lb/hr
$V$ = pit volume ft$^3$
$\Delta t$ = interval between iterations secs:
$\Delta P$ = change in pressure over time interval
Then $$\Delta P_1 = k_1 \cdot \Delta t \cdot (W_I - W_o) \quad (21)$$

Assuming:
Volume of pit = 3906 cu. ft.
Pit gas temperature = 2552° F.
Density of air at S.T.P. = 0.0764 lb/ft$^3$.
Then, $$\text{mass of air in pit} = \left[\frac{60 + 460}{2552 + 460}\right] \cdot 0.0764 \cdot 3906 = 51.52 \text{ lb} \quad (22)$$

For a 1/3600 lb per second change in mass of air in the pit, the change in pit pressure = (23)

$$\left[\frac{55.52 + 1/3600}{55.52} - 1\right] \cdot 14.7 = 0.0000793 \text{ psi}$$

Therefore, $$\Delta P_1 = 0.0000793 \cdot \frac{33.9 \cdot 12}{14.695} = 0.002194 \quad (24)$$

The pressure drop across the recuperator 14 varies directly as the flow through it, thus:

$$\Delta P_2 = k_2 \cdot W_o^2 \quad (25)$$

Assume that the pressure drop across the recuperator is 0.627 ins. H$_2$O with a mass gas flow of 5000 lb/hr. Then from (24)

$$k_2 = 0.627/5000^2 = 2.508 \cdot 10^{-8} \quad (26)$$

For a damper position D, and assuming a constant discharge characteristic, the flow may be calculated from:

$$W_o = k_3 D \sqrt{\Delta P_3} \quad (27)$$

or $$\Delta P_3 = \left[\frac{W_o}{k_3 D}\right]^2 \quad (28)$$

It should be noted that, in order to avoid dividing by zero, the stack draft in the model should have a minimum value of, say 1%. Also that, within the overall model, $\Delta P_3$ cannot fall below the stack draft.

Assume that the pressure drop across the damper is 0.23577 ins H$_2$O with the damper 80% open and passing a mass gas flow of 5000 lb/hr.

Then, from (28):

$$k_3 = \frac{W_o}{D\sqrt{\Delta P_3}} = \frac{5000}{0.8 \cdot \sqrt{0.23577}} = 12871.7 \quad (29)$$

In accordance with Perry, R. H., Chemical Engineer Handbook, McGraw Hill 1963, pp 9–43, the theoretical stack draft may be derived as follows, where:
H = stack height ft
P = barometric pressure ins. Hg
T = ambient temperature °R
T$_1$ = average stack temperature °R
S = stack draft at base of stack ins. H$_2$O.
Then $$S = 0.256 \cdot H \cdot P \cdot \left[\frac{1}{T} - \frac{1}{T_1}\right] \quad (30)$$

Assuming that the stack height is 125 feet, the barometric pressure is 29.5 ins. Hg, ambient temperature of 60° F. and a mean stack temperature of 1000° F., Then from (30):

$$S = -0.256 \cdot 125 \cdot 29.5 \cdot \left[\frac{1}{520} - \frac{1}{1460}\right] = -1.1688 \text{ ins H}_2\text{O} \quad (31)$$

Again, in accordance with Perry, R. H., Chemical Engineer Handbook, McGraw Hill 1963, pp 9–43, stack flow loss may be estimated from the following, where:
$\phi$ = stack diameter ft.
$\Delta P_5$ = stack flow loss ins. H$_2$O
Then $$\Delta P_5 = 0.0942 \cdot \left[\frac{T_1}{\phi^4}\right] \cdot \qquad (32)$$

$$\left[\frac{W_{01} + W_{02} + W_{03}}{100000}\right]^2 \cdot \left[1 + \frac{.025 \cdot H}{\phi}\right]$$

therefore, $$\Delta P_5 = k_5 [W_{01} + W_{02} + W_{03}]^2 \qquad (33)$$

Assume a stack diameter of 6.83 L ft., Then from (33):

$$\Delta P_5 = 0.0942 \cdot \left[\frac{1460}{6.83^4}\right] \cdot \left[\frac{W_{TOT}}{100000}\right]^2 \cdot \left[1 + \frac{.025 \cdot 125}{6.83}\right] \qquad (34)$$

Therefore, $$\Delta P_5 = k_5 W_{TOT}^2 \qquad (35)$$

and $$k_5 = 9.2117E - 12 \qquad (36).$$

To determine the flue gas flow as a function of damper position, a pressure balance within the system shown in FIG. 1 may be defined for pit A as follows:

Let P = pressure in pit, ins H$_2$O $$W_{023} = W_{02} + W_{03} \qquad (37)$$

$$P = S + \Delta P_2 + \Delta P_3 + \Delta P_5 - \Delta P_1 \qquad (38)$$

Substituting the appropriate equivalents gives $$(S - P) + k_2 W_o^2 + \left[\frac{W_o}{k_3 D}\right]^2 + \qquad (39)$$

$$k_5 \cdot [W_o + W_{023}]^2 - k_1 \Delta t \cdot [W_I - W_o] = 0$$

Therefore, $$\left[k_2 + \frac{1}{k_3 D} + k_5\right] \cdot W_o^2 + [2k_5 W_{023} - k_1 \Delta t] \cdot W_o - \qquad (40)$$

$$S - P - k_1 \Delta t W_I - k_5 W_{023}^2 = 0$$

Which, being a standard, quadratic equation, can be solved in the usual way for the flow $W_o$ through pit A. A similar procedure will apply, to the flow through pits B and C.

In Appendix B there is included a control program listing to control a plurality of soaking pits, such as shown in FIGS. 2 and 3.

In Appendices A and B there are included control program listings relating to the herein disclosed control of a non-linear combustion process. The control program listing is written in the Fortran language which is available for use with a variety of microprocessors. Many of these microprocessors have already been supplied to customers, including technical instruction manuals and descriptive documentation to explain to persons skilled in this art the operation of the microprocessor apparatus. This control program listing is included to provide an illustration of one suitable embodiment of the present invention that has been developed. This control program listing at the present time is more or less a development program and has not been extensively debugged through the course of practical operation for the real time control of the above operation. It is well known by persons skilled in this art that most real time control application programs contain some bugs or minor errors, and it usually takes varying periods of actual operation time to identify and routinely correct the more critical of these bugs.

```
0001:  0000         C      STACK DAMPER SIMULATION
0002:               C
0003:               C
0004:                      REAL PSTERR(3),FFWX(3),DTEM(3,5)
0005:                      REAL DELDAMP(3),MATR(3,3),LLAGGN,LLAGTM1,LLAGTM2,IN,FFWD
0006:                      REAL SETPNT(3),DAMPOSN(3),FLOWIN(3),FLOWOUT(3),RESET(3)
0007:                      REAL GAIN(3),RESTM(3),D(3),PPIT(3),FDUM(3),HYST(3)
0008:                      REAL ITAE(3),FACT(3),LLAGOUT,LAGGAIN,LDLGCOEF(5),LDLGLMT(2)
0009:                      REAL HAND(3),LLAGTIM(3),LLAGREG(3),PASTDMP(3),GSDMND(3),GSCORAT(3)
0010:                      INTEGER ISP(6),MANUAL(3)
0011:                      LOGICAL COVER(3),LMODL
0012:                      EQUIVALENCE (D(1),ISP(1))
0013:                      COMMON/FCOM/FLOWOUT,FLOWIN,DAMPOSN,PPIT,PIT,RECUP,DAMP,STACK,
0014:                     1STDRFT,DELTEF
0015:                      DATA ISP/50000,S0000,SA0A0,S0000,SA0A0,SA0A0/
0016:                      DATA HYST/0.005,0.005,0.005/
0017:                      DATA LP/21/
0018:                      DATA MATR/1.,.05,.05,.05,1.,.05,.05,.05,1./
0019:               C
0020:               C       LEAD/LAG ALGORITHM INITIALIZATION
0021:               C
0022:  0002                DELTEE=1.00
0023:                      LMODL=.FALSE.
0024:                      LDLGLMT(1)=0.0
0025:                      LDLGLMT(2)=1.0
0026:                      LLAGTM1=1.5
0027:                      LLAGTM2=2.0
0028:                      LLAGGN=3.0
0029:                      LDLGCOEF(1)=LAGGN*(2.*LLAGTM1+DELTEE)/(2.*LLAGTM2+DELTEE)
0030:                      LDLGCOEF(2)=LAGGN*(DELTEE-2.*LLAGTM1)/(2.*LLAGTM2+DELTEE)
0031:                      LDLGCOEF(3)=(2.*LLAGTM2-DELTEE)/(2.*LLAGTM2+DELTEE)
0032:               C
0033:               C       DYNAMIC AND STATE CONSTANTS
0034:               C
0035:                      PIT=.002194
0036:                      RECUP=2.51E-08
0037:                      DAMP=12871.7
```

```
        STACK=9.2117E-12

C
C       SET UP CONTROLLER CONSTANTS AND INITIALIZE
C
        FFLOW=5000.
        DAMPOSN(1)=0.7837
        DAMPOSN(2)=0.8232
        DAMPOSN(3)=0.8828
        DO 1 I=1,3
006A    SETPNT(I)=+0.1
        MANUAL(I)=1
        RESET(I)=0.0
        FLOWIN(I)=5000.
        FLOWOUT(I)=FLOWIN(I)
        GAIN(I)=0.867
        RESTM(I)=2.5
        HAND(I)=0.8
        GSCORAT(I)=6.25
        GSDMND(I)=FLOWIN(I)/GSCORAT(I)
        PASTDMP(I)=DAMPOSN(I)
        COVER(I)=.TRUE.
00EE  1 CONTINUE
C
C       INITIALIZE MODEL
C
00F4    N=0
        NMAX=110
        STDRFT=-1.1698
        REF=FLOWIN(2)
        REFG=GSDMND(2)
        FTOT=FLOWOUT(1)+FLOWOUT(2)+FLOWOUT(3)
        DSTACK=STACK*FTOT**2
        DO 12 I=1,3
0118    CALL FLOW(T,FLOWOUT)
        DRECUP=RECUP*FLOWOUT(I)**2
        DDAMP=(FLOWOUT(I)/(DAMP*DAMPOSN(I)*DAMPOSN(I)))**2
014E 12 PPIT(I)=STDRFT +DRECUP+DDAMP+DSTACK
```

```
0076:              C     BEGINNING OF DYNAMIC SIMULATION MODEL
0077:              C
0078: 0163         2     N=N+1
0079:                    IF(N.GT.NMAX) GO TO 1000
0080: 016A               WRITE(LP,7)
0081: 016D         C
0082:              C     CALCULATE STATES FOR EACH PIT; PROVIDE FLOWIN RAMPING WHERE NECCESSARY
0083:              C     AND ADD NOYSF TO INPUT FLOW
0084:              C
0085: 016E               DO 3 I=1,3
0086: 0170               CALL RAND(Y)
0087:                    IF(N.LT.10.OR.I.NE.2) GO TO 16
0088: 0184               IF(N.GT.60) GO TO 63
0089: 018A               GSDMND(2)=GSDMND(2)-REFG/16.0
0090:                    IF(GSDMND(2).GT.0.0) GO TO 64
0091: 019C               FLOWIN(2)=0.0
0092:                    GSDMND(2)=0.0
0093:                    GO TO 17
0094: 01A5         63    GSDMND(2)=GSDMND(2)+REFG/16.0
0095:                    IF(GSDMND(2).GT.REFG) GSDMND(2)=REFG
0096: 01B8               IF(N.LT.62) GO TO 17
0097: 01C0         64    FLOWIN(2)=GSDMND(2)*GSCURAT(2)+10.*Y
0098:                    GO TO 17
0099: 01D2         16    FLOWIN(I)=5000.+10.*Y
0100: 01E1         17    CONTINUE
0101:                    FLOWIN(I)=FLOWIN(I)- 10.*PPIT(I)
0102:                    FTOT=0.0
0103:                    DO 15 J=1,I
0104: 0204         15    FTOT=FTOT+FLOWOUT(J)
0105: 021A               DSTACK=STACK*FTOT**2
0106:                    DRECUP=RECUP*FLOWOUT(I)**2
0107:                    DDAMP=(FLOWOUT(I)/(DAMP*DAMPOSN(I)))**2
0108:                    DPIT=PIT*(FLOWOUT(I)-FLOWIN(I))*DELTEE
0109:                    PPIT(I)=PPIT(I)-DPIT
0110:                    SMAX=STORFT+DSTACK
0111:                    IF(PPIT(I).LT.SMAX) PPIT(I)=SMAX
0112: 027C         C
0113:              C     LEAD/LAG ALGORITHM
```

```
0114:          FLEW=GSCORAT(I)*GSDMND(I)
0115: 0286     DMPN=.14169E-03*FLEW-.45755E-07*FLEW**2+.73745E-11*FLEW**3
0116:       C
0117:       C
0118:          IN=ABS(DMPN-PASTDMP(I))
0119:          OUT=LDLGCOEF(1)*IN+LDLGCOEF(2)*PSTERR(I)
0120:          TEMP=ABS(IN/PSTERR(I))
0121:          IF(TEMP.LT.0.100) OUT=0.0
0122: 02E6     OUT=OUT+LDLGCOEF(3)*LLAGREG(I)
0123:          PASTDMP(I)=DMPN
0124:          LLAGREG(I)=OUT
0125:          PSTERR(I)=IN
0126:          FFWD=DMPN+OUT
0127:          IF(FFWD.LT.LDLGLMT(1)) FFWD=LDLGLMT(1)
0128: 0324     IF(FFWD.GT.LDLGLMT(2)) FFWD=LDLGLMT(2)
0129: 032E     IF(TEMP.LT.0.100) DELRESET=0.0
0130: 0338     IF(DELRESET.EQ.0.0) GO TO 10
0131: 0340     DELRESET=(1.-LDLGCOEF(3))*LLAGREG(I)
0132: 034D  10 FFWX(I)=FFWD
0133:
0134:       C
0135:       C  CONTROLLER - VELOCITY ALGORITHM
0136:       C
0137:          DELDAMP(I)=0.0
0138:          SETPT =SETPNT(I)+ACONST*TOTAIR
0139:          ERR=(PPIT(I)-SETPT)/(4.*DELTEE)
0140:          DD=DMPN
0141:          GAINT=GAIN(I)*(-0.01855+0.160850*DD+1.527*DD**2)/1.5262
0142:          FACT(I)=GAINT*ERR
0143: 0380     IF(MANUAL(I).EQ.0) GO TO 67
0144: 03C4     IF(COVER(I)) GO TO 66
0145:          DELDAMP(I)=0.05-DAMPOSN(I)
0146:          DAMPOSN(I)=0.05
0147: 03DE     GO TO 65
0148:       C
0149:       C  MANUAL TRACKING MODE
0150: 03E0  67 DELDAMP(I)=HAND(I)-DAMPOSN(I)
0151:          DAMPOSN(I)=HAND(I)
```

```
0152;  0401       65 RESET(I)=DAMPOSN(I)-FACT(I)
0153;                LLAGREG(I)=0.0
0154;                GO TO 6
0155;  0427       66 CONTINUE
0156;           C
0157;           C   PROPORTIONAL PLUS RESET CONTROLLER ALGORITHM
0158;           C
0159;                RESET(I)=RESFT(I)+ERR*DELTEE/RESTM(I)+DELRESET
0160;                TEMP=RESET(I)+FFWD+FACT(I)
0161;                TEMP1=TEMP
0162;                IF(TEMP.GT.1.0) TEMP=1.0
0163;  0450          IF(TEMP.LT.0.01) TEMP=0.01
0164;  0467          IF(TEMP.EQ.TEMP1) GO TO 5
0165;  046F          RESET(I)=TEMP-FFWD-FACT(I)
0166;  0487        5 DELDAMP(I)=TEMP-DAMPOSN(I)
0167;                IF(I.NE.2) GO TO 6
0168;  049C          WRITE(LP,44) FACT(I),RESET(I),FFWD,OUT,TEMP,DAMPOSN(I)
0169;  0487        6 CONTINUE
0170;           C
0171;                ERR2=PPIT(I)-SETPT
0172;                IF(N.GT.10) ITAE(I)=ITAE(I)+DELTEE*FLOAT(N-10)*ABS(ERR2)
0173;  04C7          DTEM(I,1)=PPTT
0174;  04EB          DTEM(I,2)=DRECUP
0175;                DTEM(I,3)=DDAMP
0176;                DTEM(I,4)=DSTACK
0177;                DTEM(I,5)=ERR
0178;                3 CONTINUE
0179;  051B       44 FORMAT(1H ,3F10.4,5X,3F10.4)
0180;  0521
0181;           C
0182;           C    DECOUPLING ALGORITHM
0183;           C
0184;                DO 20 I=1,3
0185;  0523          TOT=0.0
0186;                DO 21 J=1,3
0187;  052H       21 TOT=TOT+DE(DAMP(J)*MATR(I,J)
0188;  0548          AA=HYST(I)
0189;                IF(TOT.LT.0.0) AA=-AA
```

```
0190:  055C         IF((TOT/AA).LT.1.0) AA=0.0
0191:  0568         DAMPOSN(I)=DAMPOSN(I)+TOT+AA
0192:         C
0193:         C     LIST OUTPUT
0194:         C
0195:               J1=4-I
0196:               E=D(I)
0197:               E1=D(J1)
0198:               WRITE(LP,4) N,I,FLOWIN(I),FLOWOUT(I),(DTEM(I,K),K=1,4),E,PPIT(I),
0199:  0593        1DAMPOSN(I),E1,DTEM(I,5),RESET(I)
0200:  05DA     20  CONTINUE
0201:         C
0202:         C     CALCULATE NEW FLOW OUT FROM PIT
0203:         C
0204:  05E0         DO 13 I=1,3
0205:  05E2     13  CALL FLOW(T,FDUM)
0206:  05E9         DO 14 I=1,3
0207:  05EB     14  FLOWOUT(I)=FDUM(I)
0208:         C
0209:  05FE         GO TO 2
0210:  0600    1000 CONTINUE
0211:               N=N-1
0212:               DO 51 I=1,3
0213:  0604     51  ITAE(I)=ITAE(I)+DELTEE
0214:  0621         WRITE(LP,30) ITAE,N
0215:  0628         CALL EXIT
0216:  062C      4  FORMAT(1H ,2I4,2F8.0,4F8.4,A4,2F8.4,A4,2F8.4)
0217:            7  FORMAT(1H ,120X,1H*)
0218:           50  FORMAT(1H0,9H ITAE = ,3F20.4,I5)
0219:               END

PGM SIZE: 1587 POOL SIZE: 0426  ERRORS: 0000  VERSION: 12  BINARY RECS: 0056
0001:  0000  SUBROUTINE FLOW(I,FLOWOUT)
0002:        REAL FLOWOUT(3),FLOWIN(3),DAMPOSN(3),PPIT(3),FDUM(3)
0003:        COMMON/FCOM/FDUM,  FLOWIN,DAMPOSN,PPIT,PIT,RECUP,DAMP,STACK,
0004:       1STDRFT,DELTEF
0005:        FTOTSUB=0.0
0006:  0005  DO 1 J=1,2
```

```
0007:  000B            J1=I+J
0008:                  IF(J1.GT.3) J1=J1-3
0009:  0014          1 FTOTSUB=FTOTSUB+FLOWOUT(J1)
0010:  0024            A=RECUP+1./(DAMP*DAMP03N(I))**2+STACK
0011:                  B=2.*STACK*FTOTSUB+PIT*DELTEE
0012:                  C=STDRFT-PPIT(I)-PIT*DELTEE*FLOWIN(I)+STACK*FTOTSUB**2
0013:                  TEMP=B**2-4.*A*C
0014:                  IF(TEMP.GT.0.0) GO TO 2
0015:  0089            TEMP=0.0
0016:                  WRITE(21,3)
0017:  0091          3 FORMAT(1H ,35HWARNING SQUARE ROOT NEGATIVE NUMBER)
0018:                2 TEMP=SQRT(TEMP)
0019:                  FLOWOUT(I)=(-B+TEMP)/(2.*A)
0020:                  RETURN
0021:  00AD            END

PGM SIZE: 0179  POOL SIZE: 0072  ERRORS: 0000  VERSION: 12  BINARY RECS: 0008
0001: 0000     C RANDON NUMBER GENERATOR SUBROUTINE                               RAND0100
0002:            SUBROUTINE RAND(YFL)                                             RAND0110
0003:            DATA MP,MSK,4/3,S7FFF,4579/                                      RAND0120
0004:            DATA ACON,ACON/65536.,2147483647./                               RAND0130
0005:            IF(YFL.NE.0.) GO TO 1                                            RAND0140
0006: 000B    S  LDA  M                                                           RAND0150
0007: 000C    3  STA  IA                                                          RAND0160
0008: 000D    S1 LDA  IA                                                          RAND0170
0009: 000E    S  STZ  4                                                           RAND0180
0010: 000F    S  MPY  MP                                                          RAND0190
0011: 0010    S  STA  IR                                                          RAND0200
0012: 0011    S  LDA  IA                                                          RAND0210
0013: 0012    S  ADD  4                                                           RAND0220
0014: 0013    S  NJP  J2                                                          RAND0230
0015: 0014    S  JMP  J3                                                          RAND0240
0016: 0015    S2 INC  IR                                                          RAND0250
0017: 0016    S  AND  MSK                                                         RAND0260
0018: 0017    S3 STA  IE                                                          RAND0270
0019: 0018    S  LDA  IR                                                          RAND0280
0020: 0019    S  STA  IA                                                          RAND0290
0021: 001A            YF1=FLOAT(IA)                                               RAND0300
```

```
0022;                IF(YF1.LT.0.) YF1=ACON+YF1            RAND0310
0023;     0026       YF2=FLOAT(TE)*ACON                    RAND0320
0024;                YFL=(YF1+YF2)/BCON                    RAND0330
0025;                RETURN                                RAND0340
0026;     0038       END                                   RAND0350

PGM SIZE: 0063  POOL SIZE: 0022  ERRORS: 0000  VERSION: 12  BINARY RECS: 0003
M//ASSIGN R1=12
M//REWIND B1
M//LINK
 10:44:09
LINK LOADER VERSION X7
XM
ORIGIN= B5A0
LD,LD
AREA USED 85A0--BDA0
SYMBOL= FLOW
AREA USED BDA1--BE9B
LD
SYMBOL= RAND
AREA USED BE9C--BEF0
LB,F
SYMBOL= FLOAT
AREA USED BEF1--BF04
SYMBOL= E10;
AREA USED BF05--BF4D
SYMBOL= ABS
AREA USED BF4E--BF59
SYMBOL= SBT;
SYMBOL= SAT;
AREA USED BF5A--BF74
SYMBOL= TSA;
AREA USED BF75--BF7F
SYMBOL= RER;
SYMBOL= RRB;
AREA USED BF80--BF8D
SYMBOL= XID;
AREA USED BF8E--BF9F
```

```
SYMBOL= ERRORF
SYMBOL= ERRORA
SYMBOL= FMTERR
AREA USED BFA0--BFAC
UN,MP
NONE
FLOAT  = BEF9   FLOW   = BDA3   RAND   = BE9E   ABS    = BF4E
E10:   = BF13   SAT:   = BF58   RRA:   = BF81   TSA:   = BF75
ERRORA = BFA1   XTD:   = BFAE   SBT:   = BF5A   REH:   = BF80
ERRORF = BFA0   FMTERR = BFA3
FCOM   = B5A0--B5C3
:::ORG= B5A0
XE
```

| | | | | | | | | | | |
|---|---|---|---|---|---|---|---|---|---|---|
| -0.0378 | | -0.0632 | 1.0000 | | 0.8084 | | 0.8990 | | 0.8232 | |
| 1 | 1 | 5004. | 5115. | 0.2442 | 0.6568 | 0.2571 | 0.0002 | 0.4970 | 0.9138 | -0.1493 | -0.0597 |
| 1 | 2 | 5007. | 5125. | 0.2584 | 0.6592 | 0.2339 | 0.0010 | -0.5320 | 0.9104 | -0.1580 | -0.0632 |
| 1 | 3 | 5006. | 5137. | 0.2877 | 0.6623 | 0.2044 | 0.0022 | -0.5878 | 0.9049 | -0.1720 | -0.0688 |
| -0.0284 | | -0.1107 | 0.9711 | | 0.4850 | | 0.8323 | | 0.9104 | |
| 2 | 1 | 5013. | 4949. | -0.1394 | 0.6148 | 0.1771 | 0.0002 | -0.3575 | 0.7704 | -0.1144 | -0.1054 |
| 2 | 2 | 5009. | 4937. | -0.1568 | 0.6118 | 0.1775 | 0.0009 | -0.3751 | 0.8183 | -0.1188 | -0.1107 |
| 2 | 3 | 5015. | 4912. | -0.2261 | 0.6057 | 0.1779 | 0.0020 | -0.3616 | 0.8420 | -0.1154 | -0.1149 |
| -0.0249 | | -0.1524 | 0.7774 | | 0.2910 | | 0.6001 | | 0.8183 | |
| 3 | 1 | 5012. | 4982. | -0.0654 | 0.6231 | 0.2524 | 0.0002 | -0.2921 | 0.5494 | -0.0980 | -0.1447 |
| 3 | 2 | 5010. | 4983. | -0.0586 | 0.6233 | 0.2238 | 0.0009 | -0.3166 | 0.5755 | -0.1041 | -0.1524 |
| 3 | 3 | 5012. | 4999. | -0.0276 | 0.6274 | 0.2128 | 0.0021 | -0.3340 | 0.6189 | -0.1085 | -0.1583 |
| -0.0131 | | -0.1743 | 0.6615 | | 0.1746 | | 0.4735 | | 0.5755 | |
| 4 | 1 | 5008. | 4914. | -0.2059 | 0.6062 | 0.4830 | 0.0002 | 0.0863 | 0.4495 | -0.0466 | -0.1633 |
| 4 | 2 | 5009. | 4920. | -0.1969 | 0.6075 | 0.4411 | 0.0009 | -0.1197 | 0.4579 | -0.0549 | -0.1743 |
| 4 | 3 | 5012. | 4938. | -0.1621 | 0.6119 | 0.3841 | 0.0020 | -0.1719 | 0.4759 | -0.0680 | -0.1855 |
| 0.0010 | | -0.1727 | 0.5911 | | 0.1048 | | 0.4194 | | 0.4579 | |
| 5 | 1 | 5005. | 4899. | -0.2329 | 0.6025 | 0.7169 | 0.0002 | 0.1464 | 0.4131 | 0.0116 | -0.1587 |
| 5 | 2 | 5005. | 4897. | -0.2360 | 0.6020 | 0.6904 | 0.0009 | 0.1163 | 0.4102 | 0.0041 | -0.1727 |
| 5 | 3 | 5003. | 4899. | -0.2287 | 0.6024 | 0.6397 | 0.0020 | 0.0568 | 0.4090 | -0.0108 | -0.1898 |

| | | | | | | | | |
|---|---|---|---|---|---|---|---|---|
| 0.0120 | | | 0.5492 | | 0.0629 | 0.4085 | 0.4102 | |
| 6 1 | 5003. | −0.1527 | −0.1527 | 0.6109 | 0.8606 | 0.0002 | 0.2988 0.4146 | 0.0497 −0.1388 |
| 6 2 | 5001. | 4933. | −0.1528 | 0.6070 | 0.8676 | 0.0009 | 0.3001 0.4083 | 0.0500 −0.1527 |
| 6 3 | 5007. | 4918. | −0.1838 | 0.6010 | 0.8638 | 0.0020 | 0.3072 0.3986 | 0.0518 −0.1691 |
| | | 4893. | −0.2504 | | | | | |
| 0.0146 | | | 0.5241 | | 0.0377 | 0.4104 | 0.4083 | |
| 7 1 | 5001. | −0.1283 | −0.0277 | 0.6245 | 0.8735 | 0.0002 | 0.3265 0.4175 | 0.0566 −0.1161 |
| 7 2 | 4998. | 4988. | −0.0430 | 0.6219 | 0.8969 | 0.0009 | 0.3440 0.4108 | 0.0610 −0.1283 |
| 7 3 | 4999. | 4978. | −0.0659 | 0.6198 | 0.9378 | 0.0021 | 0.3731 0.4105 | 0.0683 −0.1418 |
| | | 4969. | | | | | | |
| 0.0149 | | | 0.5090 | | 0.0226 | 0.4206 | 0.4108 | |
| 8 1 | 5004. | −0.1033 | 0.0067 | 0.6276 | 0.8658 | 0.0002 | 0.3332 0.4331 | 0.0583 −0.0928 |
| 8 2 | 4997. | 5001. | 0.0058 | 0.6261 | 0.8920 | 0.0009 | 0.3497 0.4262 | 0.0624 −0.1033 |
| 8 3 | 4998. | 4994. | 0.0160 | 0.6289 | 0.8973 | 0.0021 | 0.3562 0.4131 | 0.0640 −0.1162 |
| | | 5005. | | | | | | |
| 0.0124 | | | 0.5000 | | 0.0136 | 0.4299 | 0.4262 | |
| 9 1 | 5001. | −0.0825 | 0.0577 | 0.6344 | 0.8134 | 0.0002 | 0.2755 0.4345 | 0.0439 −0.0753 |
| 9 2 | 5000. | 5027. | 0.0418 | 0.6322 | 0.8369 | 0.0009 | 0.3079 0.4306 | 0.0520 −0.0825 |
| 9 3 | 5006. | 5019. | 0.0074 | 0.6281 | 0.8849 | 0.0021 | 0.3636 0.4335 | 0.0659 −0.0898 |
| | | 5002. | | | | | | |
| −0.0226 | | | 0.5898 | | 0.1714 | 0.4342 | 0.4306 | |
| 10 1 | 5005. | −0.1329 | 0.0635 | 0.6291 | 0.8012 | 0.0002 | 0.2720 0.4511 | 0.0430 −0.0581 |
| 10 2 | 5000. | 5006. | 0.0712 | 0.6305 | 0.8175 | 0.0009 | 0.4040 0.4349 | 0.1260 −0.1329 |
| 10 3 | 5005. | 5012. | 0.0782 | 0.6377 | 0.8160 | 0.0021 | 0.2854 0.4365 | 0.0464 −0.0713 |
| | | 5041. | | | | | | |
| −0.0262 | | | 0.5915 | | 0.1573 | 0.2829 | 0.4349 | |
| 11 1 | 5003. | −0.2099 | 0.0572 | 0.6349 | 0.7503 | 0.0002 | 0.2141 0.4387 | 0.0285 −0.0466 |
| 11 2 | 4386. | 5029. | 0.2650 | 0.5099 | 0.6483 | 0.0008 | 0.6699 0.2782 | 0.1925 −0.2099 |
| 11 3 | 4998. | 4507. | 0.0396 | 0.6315 | 0.7969 | 0.0020 | 0.2458 0.4365 | 0.0364 −0.0567 |
| | | 5016. | | | | | | |
| −0.0100 | | | 0.4534 | | 0.1385 | 0.1951 | 0.2782 | |
| 12 1 | 5000. | −0.2483 | −0.0184 | 0.6253 | 0.7814 | 0.0002 | 0.2325 0.4655 | 0.0531 −0.0354 |
| 12 2 | 4074. | 4991. | −0.3457 | 0.3815 | 1.1849 | 0.0007 | 0.2842 0.1924 | 0.0961 −0.2483 |
| 12 3 | 5003. | 3899. | −0.0155 | 0.6264 | 0.7905 | 0.0018 | 0.2613 0.4610 | 0.0403 −0.0406 |
| | | 4996. | | | | | | |
| 0.0059 | | | 0.3953 | | 0.1185 | 0.1818 | 0.1924 | |
| 13 1 | 5004. | −0.2194 | 0.0520 | 0.6344 | 0.7041 | 0.0002 | 0.1806 0.4669 | 0.0201 −0.0251 |
| | | 5027. | | | | | | |

```
                                                                                                         0.0723  -0.2194
13  2    3761.  3454.  -0.6736    0.2994  1.9446   0.0007   0.3893  0.1769
13  3    5002.  5036.   0.0745    0.6365  0.7202   0.0017           0.1868  0.4613  0.0217  -0.0319
   0.0078
                                          0.0994            0.1821           0.1769                      0.0134  -0.0200
14  1    5001.  5013.   0.0271    0.6308  0.6958   0.0002   0.1535  0.4711                      0.1209  -0.1710
14  2    3442.  3353.  -0.1940    0.2822  2.1687   0.0006   0.5837  0.1876
14  3    5003.  5008.   0.0107    0.6294  0.7112   0.0016           0.1762  0.4733   0.0190  -0.0243
  -0.0018
                                          0.0825            0.1484           0.1876                      0.0117  -0.0153
15  1    5003.  5006.   0.0067    0.6289  0.6814   0.0002   0.1467  0.4723                      0.0354  -0.1569
15  2    3121.  3277.   0.3421    0.2696  1.8421   0.0006   0.2416  0.1435
15  3    5005.  5018.   0.0279    0.6320  0.6783   0.0016           0.1482  0.4688   0.0121  -0.0195
  -0.0041
                                          0.0684            0.1543           0.1435                      0.0081  -0.0121
16  1    4999.  5006.   0.0147    0.6289  0.6779   0.0002   0.1324  0.4824                      0.0952  -0.1188
16  2    2812.  2703.  -0.2391    0.1834  2.1432   0.0005   0.4807  0.1599
16  3    5005.  5005.  -0.0005    0.6287  0.6880   0.0015           0.1487  0.4809   0.0122  -0.0146
  -0.0004
                                          0.0578            0.1174           0.1599                      0.0078  -0.0090
17  1    5008.  5008.   0.0012    0.6296  0.6504   0.0002   0.1312  0.4720                      0.0117  -0.1235
17  2    2502.  2697.   0.4276    0.1826  1.7180   0.0005   0.0531  0.1118
17  3    5000.  5017.   0.0380    0.6318  0.6570   0.0015           0.1098  0.4664   0.0024  -0.0136
   0.0017
                                          0.0508            0.1205           0.1118                      0.0066  -0.0063
18  1    5002.  5004.   0.0044    0.6285  0.6783   0.0002   0.1264  0.4880                      0.0582  -0.1002
18  2    2196.  2069.  -0.2797    0.1074  2.0646   0.0005   0.3329  0.1268
18  3    5006.  4983.  -0.0490    0.6233  0.6892   0.0013           0.1596  0.4884   0.0149  -0.0077
   0.0013
                                          0.0476            0.0770           0.1268                      0.0006  -0.0065
19  1    5000.  5014.   0.0287    0.6309  0.6370   0.0002   0.0977  0.4718                      0.0562  -0.1227
19  2    1877.  2086.   0.4577    0.1092  1.6337   0.0005  -0.1249  0.0711
19  3    5004.  5030.   0.0566    0.6350  0.6402   0.0014           0.1031  0.4714   0.0008  -0.0073
  -0.0013
                                          0.0483            0.0900           0.0711                      0.0105  -0.0023
20  1    5006.  4986.  -0.0444    0.6239  0.6739   0.0002   0.1421  0.4932                      0.0637  -0.0972
20  2    1564.  1346.  -0.4795    0.0455  2.1628   0.0004   0.3547  0.0964
20  3    5000.  4990.  -0.0226    0.6250  0.6763   0.0012           0.1257  0.4899   0.0064  -0.0048
   0.0012
```

| | | | | | | | | | | |
|---|---|---|---|---|---|---|---|---|---|---|
| -0.0012 | 21 | 1 | 5003. | -0.1343 | 0.1730 | 0.0529 | 0.6345 | 0.0375 | 0.0964 | 0.0874 | 0.4738 | -0.0031 | -0.0036 |
| | 21 | 2 | 1249. | 5028. | 0.0547 | 0.6273 | 0.0002 | | -0.2705 | 0.0316 | -0.0926 | -0.1343 |
| | 21 | 3 | 5007. | 1534. | 0.6251 | 1.5295 | 0.0004 | | 0.1092 | 0.4746 | -0.0023 | -0.1343 |
| | 21 | | | 5014. | 0.0165 | 0.6323 | 0.0012 | | | | 0.0023 | -0.0039 |
| 0.0006 | 22 | 1 | 5002. | -0.0976 | 0.1603 | 0.0616 | 0.6239 | 0.0633 | 0.0316 | 0.1239 | 0.4939 | 0.0060 | -0.0012 |
| | 22 | 2 | 950. | 4986. | 0.0365 | 0.6684 | 0.0002 | | 0.4667 | 0.0696 | 0.0917 | -0.0976 |
| | 22 | 3 | 5008. | 614. | 0.7371 | 2.2810 | 0.0003 | | 0.1325 | 0.4950 | 0.0081 | 0.0006 |
| | | | | 4998. | -0.0234 | 0.6693 | 0.0010 | | | | | |
| -0.0001 | 23 | 1 | 5007. | -0.1367 | 0.1468 | 0.0743 | 0.6233 | 0.0100 | 0.0696 | 0.0982 | 0.4763 | -0.0004 | -0.0014 |
| | 23 | 2 | 826. | 5019. | 0.0257 | 0.6233 | 0.0002 | | -0.4709 | 0.0039 | -0.1427 | -0.1367 |
| | 23 | 3 | 5004. | 1053. | 0.9776 | 1.3808 | 0.0003 | | 0.0809 | 0.4743 | -0.0048 | -0.0001 |
| | | | | 5028. | 0.0517 | 0.6228 | 0.0011 | | | | | |
| 0.0000 | 24 | 1 | 5006. | -0.1211 | 0.1310 | 0.0910 | 0.6265 | 0.0100 | 0.0039 | 0.1206 | 0.4943 | 0.0051 | 0.0007 |
| | 24 | 2 | 319. | 4996. | -0.0221 | 0.6640 | 0.0002 | | 0.0742 | 0.0162 | -0.0065 | -0.1211 |
| | 24 | 3 | 5003. | 70. | 0.5451 | 1.9154 | 0.0003 | | 0.1206 | 0.4931 | 0.0052 | 0.0000 |
| | | | | 4985. | -0.0398 | 0.6668 | 0.0009 | | | | | |
| -0.0015 | 25 | 1 | 5001. | -0.1032 | 0.1117 | 0.1117 | 0.6328 | 0.0100 | 0.0162 | 0.0776 | 0.4777 | 0.0056 | -0.0016 |
| | 25 | 2 | -1. | 5021. | 0.0430 | 0.6229 | 0.0002 | | -0.4697 | 0.0040 | -0.1424 | -0.1032 |
| | 25 | 3 | 5003. | 247. | 0.5438 | 1.3973 | 0.0003 | | 0.0485 | 0.4783 | -0.0029 | -0.0015 |
| | | | | 5018. | 0.0321 | 0.6251 | 0.0010 | | | | | |
| -0.0017 | 26 | 1 | 5002. | -0.0587 | 0.0676 | 0.0670 | 0.6238 | 0.0100 | 0.0040 | 0.1148 | 0.4930 | 0.0037 | -0.0001 |
| | 26 | 2 | 5. | 4985. | -0.0372 | 0.6572 | 0.0002 | | -0.5477 | 0.0160 | -0.1619 | -0.0587 |
| | 26 | 3 | 5006. | 40. | 0.0781 | 0.6082 | 0.0002 | | 0.1210 | 0.4959 | 0.0053 | 0.0005 |
| | | | | 4991. | -0.0329 | 0.6574 | 0.0010 | | | | | |
| -0.0024 | 27 | 1 | 4999. | -0.0326 | 0.0402 | 0.0402 | 0.6312 | 0.0100 | 0.0160 | 0.0816 | 0.4776 | -0.0046 | -0.0019 |
| | 27 | 2 | 5. | 5015. | 0.0352 | 0.6245 | 0.0002 | | -0.8061 | 0.0040 | -0.2265 | -0.0326 |
| | 27 | 3 | 5004. | 123. | 0.2586 | 0.3596 | 0.0002 | | 0.0837 | 0.4785 | -0.0041 | -0.0011 |
| | | | | 5021. | 0.0373 | 0.6237 | 0.0010 | | | | | |
| 0.0025 | 28 | 1 | 5004. | -0.0166 | 0.0241 | 0.0241 | 0.6257 | 0.0100 | 0.0040 | 0.1237 | 0.4940 | 0.0052 | 0.0004 |
| | 28 | 2 | 8. | 29. | 0.0459 | 0.3102 | 0.0002 | | -0.8520 | 0.0160 | -0.2380 | -0.0166 |

```
28    3   5003.  4990. -0.0285         0.6250  0.6564  0.0100          0.1124  0.4931  0.0031  0.0001
 0.0029        -0.0074  0.0145                 0.0002                                 0.0047 -0.0014
29    1   5001.  5020.  0.0423         0.6326  0.6234  0.0002          0.0813  0.4781 -0.2778 -0.0074
29    2      9.    81.  0.1592         0.0002  0.1556  0.0002         -1.0111  0.0040 -0.0054 -0.0021
29    3   4999.  5015.  0.0343         0.6312  0.6243  0.0009          0.0782  0.4772
 0.0030        -0.0017  0.0087                 0.0002                                 0.0024 -0.0004
30    1   5000.  4987. -0.0285         0.6241  0.6567  0.0100          0.1097  0.4923 -0.2826 -0.0017
30    2     10.    19. -0.0191         0.0000  0.1341  0.0002         -1.0302  0.0159 -0.0051  0.0000
30    3   5002.  4983. -0.0422         0.6232  0.6581  0.0009          0.1205  0.4933
 0.0032         0.0016  0.0052                 0.0002                                 0.0013  0.0001
31    1   5008.  5010.  0.0044         0.6300  0.6249  0.0100          0.1053  0.4810 -0.3032  0.0016
31    2     10.    48.  0.0191         0.0001  0.0546  0.0002         -1.1128  0.0042 -0.0045 -0.0018
31    3   4999.  5017. -0.0422         0.6318  0.6242  0.0009          0.0818  0.4779
 0.0032         0.0037  0.0031                 0.0002                                 0.0042 -0.0001
32    1   5001.  5004. -0.0025         0.6285  0.6532  0.0100          0.0978  0.4919 -0.3038 -0.0037
32    2     11.    12.  0.0448         0.0000  0.0507  0.0002         -1.1153  0.0158 -0.0055  0.0004
32    3   5004.  4985. -0.0405         0.6238  0.6568  0.0009          0.1222  0.4936
 0.0033         0.0048  0.0019                 0.0002                                 0.0025 -0.0011
33    1   5002.  5006.  0.0077         0.6290  0.6250  0.0100          0.0901  0.4789 -0.3125 -0.0048
33    2     11.    27.  0.0440         0.0000  0.0177  0.0002         -1.1501  0.0041 -0.0055 -0.0018
33    3   4999.  5019.  0.0440         0.6323  0.6240  0.0009          0.0782  0.4776
 0.0033         0.0056  0.0011                 0.0002                                 0.0019 -0.0004
34    1   5000.  4992. -0.0175         0.6254  0.6558  0.0100          0.1077  0.4923 -0.3107  0.0056
34    2     12.     8. -0.0071         0.0000  0.0242  0.0002         -1.1429  0.0159 -0.0065  0.0008
34    3   5005.  4983. -0.0479         0.6233  0.6570  0.0009          0.1261  0.4944
 0.0033         0.0060  0.0007                 0.0002                                 0.0006 -0.0001
35    1   5007.  5009. -0.0054         0.6298  0.6248  0.0100          0.1023  0.4806 -0.3149  0.0060
35    2     11.    19.  0.0165         0.0000  0.0085  0.0002         -1.1595  0.0042 -0.0059 -0.0015
35    3   5000.  5022.  0.0498         0.6332  0.6228  0.0009          0.0765  0.4779
 0.0033         0.0063  0.0004                 0.0002                                 0.0011  0.0003
36    1   5003.  5002. -0.0021         0.6279  0.6538  0.0100          0.1044  0.4927
```

| | | | | | | | | | | |
|---|---|---|---|---|---|---|---|---|---|---|
| 36 | 2 | 12. | 7. | -0.0099 | 0.0000 | 0.6234 | 0.0178 | 0.0002 | -1.1497 | 0.0158 | -0.3124 | 0.0063 |
| 36 | 3 | 5001. | 4984. | -0.0381 | | | 0.6565 | 0.0009 | 0.1147 | 0.4928 | 0.0037 | 0.0001 |
| | 0.0033 | 0.0064 | 0.0002 | | | | | | | |
| 37 | 1 | 5005. | 5011. | -0.0134 | 0.0000 | 0.6302 | 0.0178 | 0.0002 | 0.0158 | | -0.0022 | -0.0006 |
| 37 | 2 | 12. | 11. | -0.0116 | 0.0001 | 0.6242 | 0.0068 | 0.0002 | 0.0910 | 0.4795 | -0.3153 | 0.0064 |
| 37 | 3 | 4999. | 5013. | 0.0306 | | 0.6309 | 0.6247 | 0.0009 | -1.1613 | 0.0042 | -0.0040 | -0.0017 |
| | 0.0033 | 0.0066 | 0.0001 | | | | | | 0.0841 | 0.4781 | | |
| 38 | 1 | 5001. | 4995. | -0.0141 | 0.0001 | 0.6261 | 0.6548 | 0.0002 | 0.0042 | | 0.0013 | 0.0001 |
| 38 | 2 | 12. | 7. | -0.0103 | | 0.0000 | 0.0166 | 0.0002 | 0.1051 | 0.4925 | -0.3127 | 0.0066 |
| 38 | 3 | 5006. | 4986. | -0.0431 | | 0.6241 | 0.6565 | 0.0009 | -1.1510 | 0.0159 | 0.0068 | 0.0010 |
| | 0.0033 | 0.0066 | 0.0001 | | | | | | 0.1271 | 0.4947 | | |
| 39 | 1 | 5000. | 4986. | -0.0214 | | 0.6299 | 0.6246 | 0.0002 | 0.0159 | | -0.0041 | -0.0017 |
| 39 | 2 | 12. | 16. | -0.0107 | | 0.0000 | 0.0064 | 0.0002 | 0.0836 | 0.4779 | -0.3154 | 0.0066 |
| 39 | 3 | 5005. | 5024. | 0.0421 | | 0.6335 | 0.6225 | 0.0009 | -1.1617 | 0.0041 | -0.0037 | -0.0004 |
| | 0.0033 | 0.0067 | 0.0001 | | | | | | 0.0851 | 0.4793 | | |
| 40 | 1 | 5007. | 4986. | -0.0450 | | 0.6240 | 0.6570 | 0.0002 | 0.0041 | | 0.0074 | 0.0012 |
| 40 | 2 | 12. | 16. | -0.0104 | | 0.0000 | 0.0166 | 0.0002 | 0.1294 | 0.4950 | -0.3128 | 0.0067 |
| 40 | 3 | 5000. | 4992. | -0.0162 | | 0.6256 | 0.6547 | 0.0009 | -1.1510 | 0.0159 | 0.0005 | -0.0002 |
| | 0.0033 | 0.0066 | 0.0000 | | | | | | 0.1020 | 0.4921 | | |
| 41 | 1 | 5001. | 5026. | 0.0543 | | 0.6340 | 0.6222 | 0.0002 | 0.0159 | | -0.0062 | -0.0013 |
| 41 | 2 | 12. | 16. | -0.0107 | | 0.0000 | 0.0064 | 0.0002 | 0.0751 | 0.4779 | -0.3154 | 0.0066 |
| 41 | 3 | 5005. | 5007. | 0.0159 | | 0.6293 | 0.6248 | 0.0009 | -1.1617 | 0.0040 | -0.0035 | -0.0016 |
| | 0.0033 | 0.0067 | 0.0000 | | | | | | 0.0862 | 0.4781 | | |
| 42 | 1 | 5002. | 4984. | -0.0372 | | 0.6255 | 0.6564 | 0.0002 | 0.0040 | | 0.0056 | 0.0007 |
| 42 | 2 | 12. | 7. | -0.0103 | | 0.0000 | 0.0167 | 0.0002 | 0.1143 | 0.4952 | -0.3127 | 0.0067 |
| 42 | 3 | 5000. | 4987. | -0.0367 | | 0.6244 | 0.6569 | 0.0009 | -1.1509 | 0.0160 | 0.0057 | 0.0007 |
| | 0.0033 | 0.0067 | 0.0000 | | | | | | 0.1229 | 0.4942 | | |
| 43 | 1 | 5004. | 5014. | 0.0227 | | 0.6311 | 0.6239 | 0.0002 | 0.0160 | | -0.0021 | -0.0007 |
| 43 | 2 | 12. | 16. | -0.0108 | | 0.0000 | 0.0064 | 0.0002 | 0.0916 | 0.4795 | -0.3154 | 0.0067 |
| 43 | 3 | 5006. | 5020. | 0.0311 | | 0.6326 | 0.6229 | 0.0009 | -1.1617 | 0.0042 | -0.0021 | -0.0002 |
| | | | | | | | | | 0.0915 | 0.4800 | | |

| | | | | | | | | | | |
|---|---|---|---|---|---|---|---|---|---|---|
| 0.0033 | 5001. | 0.0067 | 0.0000 | | 0.6261 | 0.0000 | 0.0100 | 0.0002 | | 0.0014 | −0.0001 |
| 44 1 | | 4994. | −0.0140 | 0.0000 | 0.6548 | 0.0163 | | 0.0002 | 0.1056 0.4923 | −0.3128 | 0.0067 |
| 44 2 | 12. | 7. | −0.0103 | | 0.0000 | 0.0000 | | 0.0002 | −1.1513 0.0157 | | |
| 44 3 | 5004. | 4996. | −0.0163 | | 0.6266 | 0.6540 | | 0.0009 | 0.1078 0.4931 | 0.0019 | 0.0006 |
| 0.0033 | 5003. | 0.0067 | 0.0000 | | 0.6298 | 0.0000 | 0.0100 | 0.0002 | | 0.0021 | −0.0009 |
| 45 1 | | 5009. | −0.0130 | 0.0000 | 0.6250 | 0.0064 | | 0.0002 | 0.0917 0.4793 | −0.3154 | 0.0067 |
| 45 2 | 12. | 16. | −0.0104 | | 0.0000 | 0.0000 | | 0.0002 | −1.1617 0.0042 | | |
| 45 3 | 5005. | 5013. | −0.0192 | | 0.6308 | 0.6239 | | 0.0009 | 0.0886 0.4795 | −0.0029 | −0.0006 |
| 0.0033 | 5006. | 0.0067 | 0.0000 | | 0.6258 | 0.0000 | 0.0100 | 0.0002 | | 0.0049 | 0.0010 |
| 46 1 | | 4993. | −0.0278 | 0.0000 | 0.6551 | 0.0162 | | 0.0002 | 0.1195 0.4942 | −0.3129 | 0.0067 |
| 46 2 | 12. | 7. | −0.0103 | | 0.0000 | 0.0000 | | 0.0002 | −1.1514 0.0158 | | |
| 46 3 | 5000. | 5013. | −0.0143 | | 0.6259 | 0.6546 | | 0.0009 | 0.1029 0.4920 | 0.0007 | −0.0003 |
| 0.0033 | 5002. | 0.0067 | 0.0000 | | 0.6326 | 0.0000 | 0.0100 | 0.0002 | | 0.0054 | −0.0011 |
| 47 1 | | 5020. | −0.0410 | 0.0000 | 0.6229 | 0.0064 | | 0.0002 | 0.0785 0.4784 | −0.3154 | 0.0067 |
| 47 2 | 12. | 16. | −0.0104 | | 0.0000 | 0.0000 | | 0.0002 | −1.1617 0.0042 | | |
| 47 3 | 5005. | 5007. | −0.0054 | | 0.6269 | 0.6251 | | 0.0009 | 0.0973 0.4799 | −0.0007 | −0.0005 |
| 0.0033 | 5007. | 0.0067 | 0.0000 | | 0.6241 | 0.0000 | 0.0100 | 0.0002 | | 0.0060 | 0.0013 |
| 48 1 | | 4986. | −0.0459 | 0.0000 | 0.6559 | 0.0163 | | 0.0002 | 0.1240 0.4947 | −0.3128 | 0.0067 |
| 48 2 | 12. | 7. | −0.0103 | | 0.0000 | 0.0000 | | 0.0002 | −1.1513 0.0159 | | |
| 48 3 | 5000. | 4998. | −0.0054 | | 0.6294 | 0.6546 | | 0.0009 | 0.1031 0.4922 | 0.0008 | −0.0002 |
| 0.0033 | 5002. | 0.0067 | 0.0000 | | 0.6334 | 0.0000 | 0.0100 | 0.0002 | | 0.0057 | −0.0010 |
| 49 1 | | 5024. | −0.0470 | 0.0000 | 0.6224 | 0.0064 | | 0.0002 | 0.0770 0.4782 | −0.3154 | 0.0067 |
| 49 2 | 12. | 16. | −0.0104 | | 0.0000 | 0.0000 | | 0.0002 | −1.1617 0.0040 | | |
| 49 3 | 5000. | 5008. | −0.0185 | | 0.6294 | 0.6249 | | 0.0009 | 0.0845 0.4779 | −0.0039 | −0.0018 |
| 0.0033 | 5000. | 0.0067 | 0.0000 | | 0.6240 | 0.0000 | 0.0100 | 0.0002 | | 0.0020 | −0.0003 |
| 50 1 | | 4986. | −0.0302 | 0.0000 | 0.6561 | 0.0167 | | 0.0002 | 0.1079 0.4925 | −0.3127 | 0.0067 |
| 50 2 | 12. | 7. | −0.0103 | | 0.0000 | 0.0000 | | 0.0002 | −1.1510 0.0160 | | |
| 50 3 | 5008. | 4986. | −0.0478 | | 0.6240 | 0.6572 | | 0.0009 | 0.1318 0.4954 | 0.0080 | 0.0014 |
| 0.0033 | 5005. | 0.0067 | 0.0000 | | 0.6300 | 0.0000 | 0.0100 | 0.0002 | | 0.0009 | −0.0006 |
| 51 1 | | 5010. | −0.0115 | 0.0000 | 0.6246 | 0.0063 | | 0.0002 | 0.0965 0.4797 | −0.3154 | 0.0067 |
| 51 2 | 12. | 16. | −0.0109 | | 0.0000 | 0.0000 | | 0.0002 | −1.1618 0.0040 | | |

| | | | | | | | | | | | |
|---|---|---|---|---|---|---|---|---|---|---|---|
| 51 | 3 | 5000. | 0.0067 | 0.0600 | 0.6345 | 0.0000 | 0.6216 | 0.0009 | 0.0718 | 0.4776 | -0.0070 | -0.0014 |
| 0.0033 | | | | | | | | | | | |
| 52 | 1 | 5004. | 0.0067 | 0.0155 | 0.6267 | 0.6550 | 0.0100 | 0.0040 | 0.1120 | 0.4935 | 0.0030 | 0.0006 |
| 52 | 2 | 12. | 7. | -0.0107 | 0.0000 | 0.0166 | 0.0002 | -1.1510 | 0.0159 | -0.3128 | 0.0067 |
| 52 | 3 | 5002. | 4982. | -0.0449 | 0.6230 | 0.6567 | 0.0009 | 0.1163 | 0.4933 | 0.0041 | 0.0002 |
| 0.0033 | | | | | | | | | | | |
| 53 | 1 | 5008. | 0.0067 | 0.0159 | 0.6313 | 0.6234 | 0.0100 | 0.0159 | 0.0962 | 0.4806 | -0.0010 | 0.0002 |
| 53 | 2 | 12. | 5015. | 0.0107 | 0.0000 | 0.0064 | 0.0002 | -1.1617 | 0.0042 | -0.3154 | 0.0067 |
| 53 | 3 | 5002. | 5015. | 0.0309 | 0.6314 | 0.6240 | 0.0009 | 0.0858 | 0.4787 | -0.0035 | -0.0012 |
| 0.0033 | | | | | | | | | | | |
| 54 | 1 | 5007. | 0.0067 | 0.0151 | 0.6276 | 0.6533 | 0.0100 | 0.0042 | 0.1113 | 0.4941 | -0.0010 | 0.0013 |
| 54 | 2 | 12. | 5000. | -0.0107 | 0.0000 | 0.0163 | 0.0002 | -1.1513 | 0.0158 | -0.3154 | 0.0067 |
| 54 | 3 | 5003. | 4989. | -0.0307 | 0.6248 | 0.6557 | 0.0009 | 0.1165 | 0.4935 | -0.0035 | 0.0004 |
| 0.0033 | | | | | | | | | | | |
| 55 | 1 | 5001. | 0.0067 | 0.0151 | 0.6321 | 0.6225 | 0.0100 | 0.0158 | 0.0740 | 0.4778 | 0.0028 | 0.0013 |
| 55 | 2 | 12. | 5018. | 0.0104 | 0.0000 | 0.0064 | 0.0002 | -1.1617 | 0.0040 | -0.3154 | 0.0067 |
| 55 | 3 | 5002. | 5017. | 0.0307 | 0.6317 | 0.6237 | 0.0009 | 0.0843 | 0.4785 | -0.0039 | 0.0011 |
| 0.0033 | | | | | | | | | | | |
| 56 | 1 | 5008. | 0.0067 | 0.0180 | 0.6255 | 0.6567 | 0.0100 | 0.0040 | 0.1275 | 0.4952 | -0.0065 | -0.0013 |
| 56 | 2 | 12. | 5026. | -0.0104 | 0.0000 | 0.0167 | 0.0002 | -1.1509 | 0.0160 | -0.3154 | 0.0067 |
| 56 | 3 | 5001. | 5012. | -0.0250 | 0.6247 | 0.6561 | 0.0009 | 0.1112 | 0.4929 | -0.0028 | -0.0011 |
| 0.0033 | | | | | | | | | | | |
| 57 | 1 | 5004. | 0.0067 | 0.0180 | 0.6341 | 0.6217 | 0.0100 | 0.0160 | 0.0795 | 0.4789 | 0.0069 | 0.0015 |
| 57 | 2 | 12. | 7. | -0.0104 | 0.0000 | 0.0064 | 0.0002 | -1.1617 | 0.0040 | -0.3127 | 0.0067 |
| 57 | 3 | 5001. | 4989. | 0.0285 | 0.6306 | 0.6240 | 0.0009 | 0.0862 | 0.4783 | 0.0028 | -0.0000 |
| 0.0033 | | | | | | | | | | | |
| 58 | 1 | 5005. | 0.0067 | 0.0140 | 0.6249 | 0.6553 | 0.0100 | 0.0040 | 0.1135 | 0.4937 | -0.0051 | 0.0008 |
| 58 | 2 | 12. | 4990. | -0.0107 | 0.0000 | 0.0167 | 0.0002 | -1.1510 | 0.0159 | -0.3154 | 0.0067 |
| 58 | 3 | 5001. | 4989. | -0.0285 | 0.6246 | 0.6565 | 0.0009 | 0.1146 | 0.4951 | -0.0035 | 0.0001 |
| 0.0033 | | | | | | | | | | | |
| 59 | 1 | 5006. | 0.0067 | 0.0300 | 0.6518 | 0.6579 | 0.0100 | 0.0159 | 0.0891 | 0.4727 | -0.0027 | -0.0006 |

| | | | | | | | |
|---|---|---|---|---|---|---|---|
| 59 | 2. | 12. | 16. | 0.0107 | 0.0000 | 0.0064 | 0.0002 | -1.1617 | 0.0042 | -0.3154 | 0.0067 |
| 59 | 3 | 5002. | 5014. | 0.0254 | 0.6310 | 0.6241 | 0.0009 | 0.0889 | 0.4790 | -0.0028 | -0.0010 |
| 0.0033 | | | | 0.0006 | | | | 0.0042 | | | |
| 60 | 1 | 4999. | 4995. | -0.0092 | 0.6263 | 0.6544 | 0.0002 | 0.0982 | 0.4915 | -0.0004 | -0.0005 |
| 60 | 2 | 12. | 7. | -0.0104 | 0.0000 | 0.0164 | 0.0002 | -1.1513 | 0.0157 | -0.3128 | 0.0067 |
| 60 | 3 | 5000. | 4991. | -0.0202 | 0.6253 | 0.6554 | 0.0009 | -0.1090 | 0.4924 | 0.0023 | -0.0001 |
| 0.0017 | | | | 0.0008 | | | | 0.0157 | | | |
| 61 | 1 | 5003. | 5005. | 0.0031 | 0.6286 | 0.6258 | 0.0002 | 0.0951 | 0.4801 | -0.0012 | -0.0010 |
| 61 | 2 | 23. | 16. | -0.0151 | 0.0000 | 0.0065 | 0.0002 | -1.1361 | 0.0203 | -0.3090 | 0.1169 |
| 61 | 3 | 5006. | 5010. | 0.0097 | 0.6301 | 0.6250 | 0.0009 | -0.0993 | 0.4811 | -0.0002 | -0.0002 |
| 0.0000 | | | | 0.0006 | | | | 0.0203 | | | |
| 62 | 1 | 5000. | 4995. | 0.0107 | 0.6284 | 0.6536 | 0.0002 | 0.1058 | 0.4932 | 0.0014 | -0.0004 |
| 62 | 2 | 640. | 31. | -1.3361 | 0.0000 | 0.0142 | 0.0002 | 0.1999 | 0.0586 | 0.0250 | -0.1069 |
| 62 | 3 | 5000. | 5000. | 0.0088 | 0.6276 | 0.6521 | 0.0009 | -0.0989 | 0.4930 | -0.0003 | -0.0003 |
| 0.0008 | | | | 0.0008 | | | | 0.0586 | | | |
| 63 | 1 | 5002. | 4994. | 0.0107 | 0.6264 | 0.6227 | 0.0002 | 0.0894 | 0.4816 | -0.0027 | -0.0015 |
| 63 | 2 | 936. | 775. | 0.3519 | 0.0000 | 1.0557 | 0.0003 | 0.5518 | 0.1183 | 0.1130 | -0.0617 |
| 63 | 3 | 5000. | 5000. | 0.0155 | 0.6292 | 0.6226 | 0.0011 | -0.0834 | 0.4808 | -0.0041 | -0.0020 |
| 0.0008 | | | | 0.0010 | | | | 0.1183 | | | |
| 64 | 1 | 5002. | 4994. | 0.0161 | 0.6260 | 0.6491 | 0.0002 | 0.1056 | 0.4927 | 0.0014 | -0.0009 |
| 64 | 2 | 1252. | 1344. | 0.2017 | 0.0453 | 0.7790 | 0.0004 | 0.3501 | 0.1552 | 0.0625 | -0.0367 |
| 64 | 3 | 5001. | 4989. | -0.0268 | 0.6247 | 0.6500 | 0.0012 | 0.1102 | 0.4928 | 0.0025 | 0.0010 |
| 0.0007 | | | | 0.0007 | | | | 0.1552 | | | |
| 65 | 1 | 5005. | 5010. | 0.0111 | 0.6301 | 0.6242 | 0.0002 | 0.0945 | 0.4801 | -0.0014 | -0.0015 |
| 65 | 2 | 1568. | 1616. | 0.1250 | 0.0655 | 0.6541 | 0.0004 | 0.2447 | 0.1769 | 0.0625 | -0.0222 |
| 65 | 3 | 5005. | 5012. | 0.0155 | 0.6305 | 0.6242 | 0.0013 | 0.0944 | 0.4800 | -0.0025 | -0.0015 |
| 0.0010 | | | | 0.0010 | | | | 0.1769 | | | |
| 66 | 1 | 5006. | 4997. | 0.0205 | 0.6267 | 0.6539 | 0.0002 | 0.1150 | 0.4937 | 0.0038 | 0.0001 |
| 66 | 2 | 1874. | 1865. | -0.0173 | 0.0873 | 0.6712 | 0.0004 | 0.2625 | 0.2041 | 0.0406 | -0.0060 |
| 66 | 3 | 5002. | 4996. | -0.0132 | 0.6265 | 0.6539 | 0.0013 | 0.1077 | 0.4925 | 0.0019 | -0.0007 |

| | | | | | | | | | | |
|---|---|---|---|---|---|---|---|---|---|---|
| 0.0017 | | | 0.2140 | 0.0221 | | | | | 0.0018 | -0.0007 |
| 67 | 1 | 5008. | | | 0.6321 | 0.0467 | 0.6236 | 0.2041 | | |
| 67 | 2 | 2193. | -0.0464 | | 0.1174 | | 0.6780 | 0.0929 | 0.4814 | 0.0572 | 0.0169 |
| 67 | 3 | 5003. | 0.0177 | | 0.6303 | | 0.6248 | 0.0904 | 0.2376 | -0.0024 | -0.0017 |
| 0.0020 | | | 0.2305 | -0.0057 | | | | | | |
| | | | | | | | | | 0.4802 | |
| 68 | 1 | 5000. | | | 0.6275 | 0.0470 | 0.6512 | 0.2376 | | -0.0003 | -0.0008 |
| 68 | 2 | 2497. | -0.0046 | | 0.1568 | | 0.6676 | 0.0987 | 0.4925 | 0.0560 | 0.0393 |
| 68 | 3 | 4994. | -0.0136 | | 0.6259 | | 0.6529 | 0.0904 | 0.2772 | 0.0010 | -0.0013 |
| 0.0027 | | | 0.2517 | 0.0140 | | | | | | |
| | | | | | | | | | 0.4922 | |
| 69 | 1 | 5002. | | | 0.6295 | 0.0510 | 0.6242 | 0.2772 | | -0.0033 | -0.0023 |
| 69 | 2 | 2817. | -0.0272 | | 0.1975 | | 0.6180 | 0.0846 | 0.4798 | 0.0628 | 0.0644 |
| 69 | 3 | 5003. | -0.0097 | | 0.6295 | | 0.6247 | 0.0943 | 0.3229 | -0.0014 | -0.0019 |
| 0.0031 | | | 0.2799 | 0.0274 | | | | | | |
| | | | | | | | | | 0.4808 | |
| 70 | 1 | 5002. | | | 0.6250 | 0.0589 | 0.6528 | 0.3229 | | -0.0030 | -0.0011 |
| 70 | 2 | 3131. | -0.0124 | | 0.2470 | | 0.5698 | 0.1121 | 0.4938 | 0.0596 | 0.0883 |
| 70 | 3 | 5009. | -0.0285 | | 0.6265 | | 0.6517 | 0.1228 | 0.3770 | 0.0057 | 0.0004 |
| 0.0035 | | | 0.3167 | -0.0134 | | | | | | |
| | | | | | | | | | 0.4959 | |
| 71 | 1 | 5014. | | | 0.6311 | 0.0708 | 0.6224 | 0.3770 | | -0.0013 | -0.0013 |
| 71 | 2 | 3451. | -0.0190 | | 0.2989 | | 0.5058 | 0.0987 | 0.4820 | 0.0547 | 0.1101 |
| 71 | 3 | 5025. | 0.0515 | | 0.6339 | | 0.6199 | 0.0713 | 0.4342 | -0.0072 | -0.0025 |
| 0.0045 | | | 0.3634 | -0.0125 | | | | | | |
| | | | | | | | | | 0.4794 | |
| 72 | 1 | 5008. | | | 0.6281 | 0.0866 | 0.6500 | 0.4342 | | 0.0028 | -0.0001 |
| 72 | 2 | 3754. | -0.0041 | | 0.3534 | | 0.4508 | 0.1112 | 0.4955 | 0.0557 | 0.1324 |
| 72 | 3 | 5002. | -0.0375 | | 0.6236 | | 0.6524 | 0.1088 | 0.3228 | 0.5058 | -0.0016 |
| | | | | | | | | | 0.4939 | |
| 0.0055 | | | 0.4215 | 0.0305 | | | | | | |
| 73 | 1 | 5006. | | | 0.6326 | 0.1064 | 0.6195 | 0.5058 | | -0.0048 | 0.0021 |
| 73 | 2 | 4061. | 0.0100 | | 0.4150 | | 0.3901 | 0.0808 | 0.4814 | 0.0530 | 0.1536 |
| 73 | 3 | 5012. | 0.0150 | | 0.6306 | | 0.6217 | 0.3118 | 0.5843 | -0.0018 | -0.0023 |
| | | | | | | | | | 0.4818 | |
| 0.0085 | | | 0.4919 | -0.0514 | | | | | | |
| 74 | 1 | 5008. | | | 0.6259 | 0.1303 | 0.6447 | 0.5843 | | 0.0051 | -0.0008 |
| 74 | 2 | 4378. | -0.0517 | | 0.4780 | | 0.3367 | 0.1124 | 0.4962 | 0.0609 | 0.1779 |

| | | | | | | | | | |
|---|---|---|---|---|---|---|---|---|---|
| 74 | 3 | 5009. | 4998. | -0.0246 | 0.6269 | 0.6495 | 0.7916 | 0.0019 | 0.1175 0.4968 0.0044 -0.0005 |
| | | | 0.2036 | 0.5765 | | 0.1582 | | | 0.6836 |
| 75 | 1 | 5008. | 5021. | 0.0281 | 0.6328 | 0.6179 | 0.0002 | 0.0843 0.4827 -0.0039 -0.0024 |
| 75 | 2 | 4692. | 4686. | -0.0122 | 0.5512 | 0.2836 | 0.0009 | 0.3565 0.7952 0.0641 0.2036 |
| 75 | 3 | 5003. | 5024. | 0.0056 | 0.6336 | 0.6172 | 0.0020 | 0.0719 0.4811 -0.0070 -0.0034 |
| | | | 0.2302 | 0.6765 | | 0.1901 | | | 0.7952 |
| 76 | 1 | 5003. | 4998. | -0.0107 | 0.6269 | 0.6471 | 0.0002 | 0.0952 0.4947 -0.0012 -0.0029 |
| 76 | 2 | 4997. | 4993. | -0.0097 | 0.6257 | 0.2380 | 0.0009 | 0.3662 0.9278 0.0665 0.2302 |
| 76 | 3 | 5002. | 4988. | -0.0310 | 0.6244 | 0.6487 | 0.0021 | 0.1029 0.4949 0.0007 -0.0031 |
| -0.0219 | | | 0.1936 | 0.6005 | | 0.1141 | | | 0.9278 |
| 77 | 1 | 5007. | 5009. | 0.0051 | 0.6297 | 0.6187 | 0.0002 | 0.0900 0.4685 -0.0025 -0.0039 |
| 77 | 2 | 4999. | 5287. | 0.6318 | 0.7016 | 0.1960 | 0.0010 | -0.2656 0.7660 0.0914 0.1936 |
| 77 | 3 | 5007. | 5011. | 0.0101 | 0.6303 | 0.6188 | 0.0022 | 0.0928 0.4688 -0.0018 -0.0038 |
| -0.0212 | | | 0.1582 | 0.5548 | | 0.0684 | | | 0.7660 |
| 78 | 1 | 5002. | 4984. | -0.0392 | 0.6235 | 0.6830 | 0.0002 | 0.1292 0.4894 0.0073 -0.0010 |
| 78 | 2 | 5010. | 5005. | -0.0110 | 0.6249 | 0.2578 | 0.0009 | -0.2546 0.6887 0.0914 0.1582 |
| 78 | 3 | 5002. | 4985. | -0.0380 | 0.6238 | 0.6826 | 0.0021 | 0.1308 0.4898 0.0077 -0.0007 |
| -0.0203 | | | 0.1243 | 0.5275 | | 0.0411 | | | 0.6887 |
| 79 | 1 | 4999. | 5016. | 0.0367 | 0.6314 | 0.6339 | 0.0002 | 0.0924 0.4761 -0.0019 -0.0017 |
| 79 | 2 | 4996. | 4996. | -0.0157 | 0.6265 | 0.3176 | 0.0009 | -0.2389 0.6260 0.0847 0.1243 |
| 79 | 3 | 5001. | 5017. | 0.0372 | 0.6318 | 0.6334 | 0.0021 | 0.0936 0.4765 -0.0016 -0.0013 |
| -0.0155 | | | 0.0983 | 0.5116 | | 0.0246 | | | 0.6260 |
| 80 | 1 | 5004. | 4987. | -0.0375 | 0.6241 | 0.6621 | 0.0002 | 0.1300 0.4934 0.0075 0.0013 |
| 80 | 2 | 5006. | 4970. | -0.0798 | 0.6200 | 0.3805 | 0.0009 | -0.1595 0.5901 0.0649 0.0983 |
| 80 | 3 | 5000. | 4989. | -0.0250 | 0.6246 | 0.6614 | 0.0021 | 0.1195 0.4922 -0.0049 0.0006 |
| -0.0131 | | | 0.0764 | 0.5012 | | 0.0148 | | | 0.5901 |
| 81 | 1 | 5003. | 5021. | 0.0414 | 0.6329 | 0.6250 | 0.0002 | 0.0886 0.4793 0.0028 0.0001 |
| 81 | 2 | 5003. | 4985. | -0.0402 | 0.6237 | 0.4307 | 0.0009 | -0.1193 0.5588 0.0548 0.0764 |
| 81 | 3 | 5003. | 5014. | 0.0232 | 0.6309 | 0.6262 | 0.0021 | 0.0963 0.4798 -0.0009 0.0002 |
| -0.0091 | | | 0.0613 | 0.4953 | | 0.0089 | | | 0.5588 |
| 82 | 1 | 5002. | 4991. | -0.0231 | 0.6253 | 0.6546 | 0.5475 0.0002 | 0.1118 0.4933 0.0029 0.0013 |

| | | | | | | | | | | |
|---|---|---|---|---|---|---|---|---|---|---|
| 82 | 2 | 5009. | 4979. | -0.0679 | 0.6221 | 0.4791 | 0.0009 | -0.0514 | 0.5434 | -0.0379 | 0.0613 |
| 82 | 3 | 5004. | 4995. | -0.0190 | 0.6263 | 0.6543 | 0.0021 | 0.1153 | 0.4940 | -0.0038 | 0.0018 |
| -0.0086 | | | 0.0469 | 0.4917 | | 0.0053 | 0.5301 | 0.5434 | | | |
| 83 | 1 | 5003. | 5013. | 0.0220 | 0.6308 | 0.6233 | 0.0002 | 0.0898 | 0.4801 | -0.0026 | 0.0003 |
| 83 | 2 | 5003. | 4999. | -0.0687 | 0.6273 | 0.5108 | 0.0009 | -0.0432 | 0.5244 | -0.0358 | 0.0469 |
| 83 | 3 | 5006. | 5016. | 0.0236 | 0.6316 | 0.6225 | 0.0021 | 0.0917 | 0.4808 | -0.0021 | 0.0009 |
| -0.0060 | | | 0.0369 | 0.4896 | | 0.0032 | 0.5205 | 0.5244 | | | |
| 84 | 1 | 5000. | 4993. | -0.0142 | 0.6257 | 0.6529 | 0.0002 | 0.1047 | 0.4926 | 0.0012 | 0.0008 |
| 84 | 2 | 5002. | 4983. | -0.0431 | 0.6231 | 0.5449 | 0.0009 | -0.0000 | 0.5213 | -0.0250 | 0.0369 |
| 84 | 3 | 5004. | 4997. | -0.0170 | 0.6266 | 0.6518 | 0.0021 | 0.1088 | 0.4939 | -0.0022 | 0.0018 |
| -0.0044 | | | 0.0295 | 0.4887 | | 0.0019 | 0.5134 | 0.5213 | | | |
| 85 | 1 | 5005. | 5008. | 0.0070 | 0.6295 | 0.6237 | 0.0002 | 0.0977 | 0.4810 | 0.0006 | 0.0005 |
| 85 | 2 | 5008. | 4996. | -0.0254 | 0.6264 | 0.5543 | 0.0009 | -0.0258 | 0.5077 | -0.0186 | 0.0295 |
| 85 | 3 | 5002. | 5014. | 0.0287 | 0.6311 | 0.6221 | 0.0021 | 0.0804 | 0.4794 | -0.0049 | 0.0001 |
| -0.0038 | | | 0.0232 | 0.4875 | | 0.0011 | 0.5069 | 0.5077 | | | |
| 86 | 1 | 5007. | 4998. | -0.0192 | 0.6270 | 0.6519 | 0.0002 | 0.1169 | 0.4950 | 0.0042 | 0.0022 |
| 86 | 2 | 5004. | 4999. | -0.0106 | 0.6271 | 0.5852 | 0.0009 | -0.0367 | 0.5078 | -0.0158 | 0.0232 |
| 86 | 3 | 5001. | 4988. | -0.0281 | 0.6244 | 0.6533 | 0.0021 | 0.1087 | 0.4930 | -0.0011 | 0.0007 |
| -0.0035 | | | 0.0173 | 0.4871 | | 0.0007 | 0.5009 | 0.5078 | | | |
| 87 | 1 | 5003. | 5021. | 0.0392 | 0.6327 | 0.6209 | 0.0002 | 0.0777 | 0.4794 | 0.0056 | 0.0000 |
| 87 | 2 | 4999. | 4999. | -0.0046 | 0.6274 | 0.5851 | 0.0009 | -0.0412 | 0.4951 | -0.0147 | 0.0173 |
| 87 | 3 | 5001. | 5011. | 0.0132 | 0.6301 | 0.6233 | 0.0021 | 0.0956 | 0.4806 | -0.0011 | 0.0003 |
| -0.0019 | | | 0.0141 | 0.4868 | | 0.0004 | 0.4989 | 0.4951 | | | |
| 88 | 1 | 5006. | 4988. | -0.0203 | 0.6244 | 0.6534 | 0.0002 | 0.1182 | 0.4948 | 0.0046 | 0.0018 |
| 88 | 2 | 5000. | 4988. | -0.0262 | 0.6245 | 0.6128 | 0.0009 | -0.0675 | 0.4998 | -0.0081 | 0.0141 |
| 88 | 3 | 5001. | 4997. | -0.0087 | 0.6267 | 0.6525 | 0.0021 | 0.1038 | 0.4930 | -0.0010 | 0.0007 |
| -0.0017 | | | 0.0113 | 0.4866 | | 0.0002 | 0.4963 | 0.4998 | | | |
| 89 | 1 | 5003. | 5020. | 0.0360 | 0.6326 | 0.6213 | 0.0002 | 0.0813 | 0.4796 | -0.0047 | -0.0000 |
| 89 | 2 | 5003. | 5001. | -0.0047 | 0.6278 | 0.6044 | 0.0009 | -0.0722 | 0.4954 | -0.0070 | -0.0113 |
| 89 | 3 | 5001. | 5009. | 0.0170 | 0.6297 | 0.6230 | 0.0021 | 0.0859 | 0.4742 | -0.0035 | -0.0007 |

| | | | | | | | | | | | | |
|---|---|---|---|---|---|---|---|---|---|---|---|---|
| -0.0014 | | | 0.0090 | 0.4865 | | | 0.0001 | 0.4941 | | | 0.0031 | 0.0012 |
| 90 | 1 | 5004. | 4990. | -0.0311 | 0.6249 | 0.6532 | 0.0002 | 0.1125 | 0.4937 | -0.0058 | 0.0090 |
| 90 | 2 | 5003. | 5001. | -0.0044 | 0.6278 | 0.6152 | 0.0009 | 0.0770 | 0.4950 | -0.0037 | 0.0007 |
| 90 | 3 | 5002. | 4989. | 0.0280 | 0.6246 | 0.6542 | 0.0021 | 0.1148 | 0.4934 | | |
| -0.0014 | | | 0.0066 | 0.4865 | | | 0.0001 | 0.4917 | | | 0.0016 | 0.0006 |
| 91 | 1 | 5007. | 5015. | 0.0182 | 0.6313 | 0.6228 | 0.0002 | 0.0935 | 0.4809 | -0.0059 | 0.0066 |
| 91 | 2 | 5003. | 5003. | 0.0004 | 0.6283 | 0.6165 | 0.0009 | 0.0763 | 0.4909 | -0.0044 | -0.0010 |
| 91 | 3 | 4999. | 5014. | 0.0326 | 0.6310 | 0.6234 | 0.0021 | 0.0822 | 0.4788 | | |
| -0.0008 | | | 0.0053 | 0.4864 | | | 0.0001 | 0.4909 | | | 0.0004 | 0.0004 |
| 92 | 1 | 5000. | 4998. | -0.0047 | 0.6270 | 0.6519 | 0.0002 | 0.0982 | 0.4921 | -0.0033 | 0.0053 |
| 92 | 2 | 5003. | 4998. | 0.0107 | 0.6271 | 0.6258 | 0.0009 | 0.0868 | 0.4917 | 0.0036 | 0.0004 |
| 92 | 3 | 5000. | 4986. | 0.0321 | 0.6239 | 0.6546 | 0.0021 | 0.1143 | 0.4929 | | |
| -0.0011 | | | 0.0034 | 0.4864 | | | 0.0000 | 0.4887 | | | 0.0020 | 0.0004 |
| 93 | 1 | 5000. | 5006. | 0.0061 | 0.6289 | 0.6245 | 0.0002 | 0.0921 | 0.4800 | -0.0048 | 0.0034 |
| 93 | 2 | 5003. | 5003. | 0.0054 | 0.6283 | 0.6250 | 0.0009 | 0.0810 | 0.4880 | 0.0017 | -0.0003 |
| 93 | 3 | 5003. | 5012. | 0.0210 | 0.6306 | 0.6241 | 0.0021 | 0.0933 | 0.4802 | | |
| -0.0002 | | | 0.0036 | 0.4864 | | | 0.0000 | 0.4902 | | | 0.0022 | 0.0005 |
| 94 | 1 | 5001. | 4994. | 0.0164 | 0.6259 | 0.6533 | 0.0002 | 0.1087 | 0.4929 | 0.0006 | 0.0036 |
| 94 | 2 | 5005. | 4995. | 0.0172 | 0.6263 | 0.6325 | 0.0009 | 0.1026 | 0.4910 | 0.0054 | 0.0019 |
| 94 | 3 | 5007. | 4994. | 0.0288 | 0.6261 | 0.6528 | 0.0021 | 0.1217 | 0.4951 | | |
| -0.0009 | | | 0.0022 | 0.4864 | | | 0.0000 | 0.4877 | | | 0.0019 | 0.0003 |
| 95 | 1 | 5003. | 5011. | 0.0164 | 0.6302 | 0.6537 | 0.0002 | 0.0922 | 0.4799 | -0.0036 | 0.0022 |
| 95 | 2 | 5002. | 5010. | 0.0172 | 0.6301 | 0.6362 | 0.0009 | 0.0854 | 0.4868 | 0.0075 | -0.0022 |
| 95 | 3 | 5000. | 5023. | 0.0510 | 0.6332 | 0.6554 | 0.0021 | 0.0698 | 0.4779 | | |
| -0.0003 | | | 0.0016 | 0.4864 | | | 0.0000 | 0.4877 | | | 0.0013 | 0.0002 |
| 96 | 1 | 5003. | 4994. | 0.0134 | 0.6260 | 0.6537 | 0.0002 | 0.1052 | 0.4925 | 0.0014 | 0.0016 |
| 96 | 2 | 5002. | 4997. | 0.0088 | 0.6269 | 0.6362 | 0.0009 | 0.0943 | 0.4886 | 0.0068 | -0.0011 |
| 96 | 3 | 5006. | 4980. | 0.0570 | 0.6225 | 0.6554 | 0.0021 | 0.1272 | 0.4950 | | |
| -0.0003 | | | 0.0012 | 0.4864 | | | 0.0000 | 0.4873 | | | 0.0032 | 0.0011 |
| 97 | 1 | 5000. | 5008. | 0.0172 | 0.6296 | 0.6241 | 0.0002 | 0.0873 | 0.4791 | -0.0011 | 0.0012 |
| 97 | 2 | 5002. | 5002. | 0.0013 | 0.6279 | 0.6325 | 0.0009 | 0.0956 | 0.4865 | | |

| | | | | | | | | | | | |
|---|---|---|---|---|---|---|---|---|---|---|---|
| 97 | 3 | 5009. | 0.0023 | 0.4864 | 0.0337 | 0.6315 | 0.0000 | 0.6217 | 0.4893 | 0.0021 | 0.0935 | 0.4815 | −0.0016 | 0.0009 |
| 98 | 1 | 5009. | 4989. | −0.0442 | 0.6246 | 0.6544 | 0.0002 | 0.1315 | 0.4958 | 0.0079 | 0.0021 |
| 98 | 2 | 5008. | 5001. | −0.0155 | 0.6277 | 0.6378 | 0.0009 | 0.1111 | 0.4902 | 0.0028 | 0.0023 |
| 98 | 3 | 5006. | 5000. | −0.0122 | 0.6276 | 0.6510 | 0.0021 | 0.1057 | 0.4940 | 0.0014 | 0.0015 |
| −0.0013 | 1 | 4999. | 0.0001 | 0.4864 | 0.0442 | 0.6346 | 0.0000 | 0.6207 | 0.4852 | 0.0002 | 0.0673 | 0.4775 | −0.0082 | −0.0012 |
| 99 | 1 | 5000. | 5028. | 0.0447 | 0.6312 | 0.6316 | 0.0002 | 0.0784 | 0.4791 | −0.0054 | −0.0001 |
| 99 | 2 | 5002. | 5015. | 0.0327 | 0.6312 | 0.6221 | 0.0009 | 0.0782 | 0.4785 | −0.0054 | −0.0007 |
| 99 | 3 | 5002. | 5015. | 0.0275 | 0.0021 | | | | | | |
| 0.0016 | 1 | 5009. | 0.0028 | 0.4864 | 0.0456 | 0.6222 | 0.0000 | 0.6562 | 0.4908 | 0.0002 | 0.1328 | 0.4965 | 0.0082 | 0.0021 |
| 100 | 1 | 5007. | 4979. | −0.0484 | 0.6238 | 0.6535 | 0.0002 | 0.1268 | 0.4969 | 0.0067 | 0.0028 |
| 100 | 2 | 5004. | 4985. | −0.0378 | 0.6241 | 0.6553 | 0.0009 | 0.1160 | 0.4945 | 0.0040 | 0.0009 |
| 100 | 3 | 5004. | 4986. | −0.0378 | 0.0021 | | | | | | |
| −0.0008 | 1 | 5002. | 0.0014 | 0.4864 | 0.0607 | 0.6349 | 0.0000 | 0.6193 | 0.4870 | 0.0002 | 0.0722 | 0.4781 | −0.0070 | 0.0007 |
| 101 | 1 | 5008. | 5029. | 0.0405 | 0.6341 | 0.6175 | 0.0002 | 0.0862 | 0.4810 | −0.0034 | −0.0014 |
| 101 | 2 | 5006. | 5026. | 0.0230 | 0.6318 | 0.6213 | 0.0009 | 0.0926 | 0.4800 | −0.0019 | 0.0002 |
| 101 | 3 | 5006. | 5017. | | 0.0021 | | | | | | |
| 0.0006 | 1 | 5002. | 0.0024 | 0.4864 | 0.0407 | 0.6233 | 0.0000 | 0.6557 | 0.4894 | 0.0002 | 0.4810 | 0.4936 | 0.0032 | 0.0006 |
| 102 | 1 | 5007. | 4983. | −0.0256 | 0.6266 | 0.6514 | 0.0002 | 0.1129 | 0.4953 | 0.0025 | 0.0024 |
| 102 | 2 | 5003. | 4996. | −0.0148 | 0.6267 | 0.6540 | 0.0009 | 0.1098 | 0.4937 | 0.0018 | 0.0009 |
| 102 | 3 | 5003. | 4997. | | 0.0021 | | 0.1073 | | | |
| −0.0008 | 1 | 5002. | 0.0010 | 0.4864 | 0.0262 | 0.6310 | 0.0000 | 0.6228 | 0.4866 | 0.0002 | 0.4953 | 0.4790 | −0.0033 | 0.0007 |
| 103 | 1 | 5008. | 5014. | 0.0235 | 0.6321 | 0.6197 | 0.0002 | 0.0867 | 0.4808 | −0.0034 | 0.0010 |
| 103 | 2 | 5006. | 5018. | 0.0161 | 0.6307 | 0.6224 | 0.0009 | 0.0864 | 0.4800 | −0.0022 | 0.0000 |
| 103 | 3 | 5006. | 5013. | | 0.0021 | | 0.0912 | | | |
| 0.0003 | 1 | 4999. | 0.0005 | 0.4864 | 0.0204 | 0.6249 | 0.0000 | 0.6549 | 0.4863 | 0.0002 | 0.4808 | 0.4924 | 0.0018 | 0.0000 |
| 104 | 1 | 4999. | 4990. | −0.0063 | 0.6266 | 0.6518 | 0.0002 | 0.1072 | 0.4920 | 0.0018 | 0.0000 |
| 104 | 2 | 4999. | 4996. | −0.0067 | 0.6264 | 0.6536 | 0.0009 | 0.0926 | 0.4919 | −0.0002 | 0.0003 |
| 104 | 3 | 4999. | 4996. | | 0.0021 | | 0.0991 | | | |
| −0.0005 | 1 | 4999. | −0.0011 | 0.4864 | 0.0201 | 0.6296 | 0.0000 | 0.6244 | 0.4845 | 0.0002 | 0.4920 | 0.4785 | −0.0052 | −0.0015 |
| 105 | 1 | 4999. | 5008. | | | | | | | 0.0870 | | |

| | | | | | | | | | | |
|---|---|---|---|---|---|---|---|---|---|---|
| 105 | 2 | 4999. | 5002. | 0.0067 | 0.6281 | 0.0009 | | 0.0860 | 0.4787 | -0.0035 | -0.0011 |
| 105 | 3 | 5000. | 5005. | 0.0107 | 0.6287 | 0.0021 | | 0.0884 | 0.4787 | -0.0029 | -0.0012 |
| | | 0.0018 | 0.0020 | 0.4864 | 0.0000 | 0.4902 | 0.4787 | | | | |
| 106 | 1 | 5002. | 4987. | -0.0321 | 0.6243 | 0.6555 | 0.0002 | 0.1194 | 0.4942 | 0.0048 | 0.0006 |
| 106 | 2 | 5007. | 4987. | -0.0445 | 0.6243 | 0.6552 | 0.0009 | 0.1305 | 0.4962 | 0.0076 | 0.0020 |
| 106 | 3 | 5004. | 4989. | -0.0341 | 0.6246 | 0.6554 | 0.0021 | 0.1226 | 0.4948 | 0.0056 | 0.0011 |
| | | -0.0012 | -0.0001 | 0.4864 | 0.0000 | 0.4851 | 0.4962 | | | | |
| 107 | 1 | 5004. | 5017. | 0.0282 | 0.6317 | 0.6218 | 0.0002 | 0.0912 | 0.4796 | -0.0022 | -0.0003 |
| 107 | 2 | 5004. | 5027. | 0.0510 | 0.6343 | 0.6197 | 0.0009 | 0.0795 | 0.4792 | -0.0051 | -0.0001 |
| 107 | 3 | 5005. | 5020. | 0.0346 | 0.6326 | 0.6212 | 0.0021 | 0.0880 | 0.4795 | -0.0030 | -0.0001 |
| | | 0.0004 | 0.0005 | 0.4864 | 0.0000 | 0.4872 | 0.4792 | | | | |
| 108 | 1 | 5006. | 4994. | -0.0272 | 0.6259 | 0.6544 | 0.0002 | 0.1190 | 0.4950 | 0.0048 | 0.0016 |
| 108 | 2 | 5001. | 4989. | -0.0265 | 0.6247 | 0.6543 | 0.0009 | 0.1060 | 0.4932 | 0.0015 | 0.0005 |
| 108 | 3 | 5005. | 4993. | -0.0257 | 0.6257 | 0.6543 | 0.0021 | 0.1136 | 0.4943 | 0.0034 | 0.0012 |
| | | 0.0002 | 0.0008 | 0.4864 | 0.0000 | 0.4874 | 0.4943 | | | | |
| 109 | 1 | 5005. | 5021. | 0.0340 | 0.6328 | 0.6210 | 0.0002 | 0.0850 | 0.4800 | -0.0038 | 0.0001 |
| 109 | 2 | 5009. | 5010. | 0.0024 | 0.6300 | 0.6229 | 0.0009 | 0.1034 | 0.4816 | 0.0009 | 0.0008 |
| 109 | 3 | 5009. | 5017. | 0.0173 | 0.6318 | 0.6217 | 0.0021 | 0.0957 | 0.4812 | -0.0011 | 0.0008 |
| | | 0.0007 | 0.0020 | 0.4864 | 0.0000 | 0.4891 | 0.4816 | | | | |
| 110 | 1 | 5009. | 4993. | -0.0345 | 0.6258 | 0.6532 | 0.0002 | 0.1195 | 0.4954 | 0.0049 | 0.0021 |
| 110 | 2 | 5008. | 5004. | -0.0080 | 0.6286 | 0.6517 | 0.0009 | 0.1114 | 0.4949 | 0.0028 | 0.0020 |
| 110 | 3 | 5006. | 5001. | -0.0110 | 0.6277 | 0.6520 | 0.0021 | 0.1068 | 0.4941 | 0.0017 | 0.0015 |

IYAE = 70.4637    1909.9666    67.1136    110

```
0001  0000  C     STACK DAMPER CONTROL PROGRAM
0002        C
0003              REAL SETPNT(3),DAMPOSN(3),RESET(3),IN,MATR(3,3),DELDAMP(3)
0004              REAL GAIN(3),RESTM(3),PPIT(3),HYST(3),PSTERR(3)
0005              REAL ITAE(3),FACT(3),LLAGOUT,LAGGAIN,LDLGCOEF(5),LDLGLMT(2)
0006              REAL HAND(3),LLAGTIM(3),LLAGREG(3),PASTDMP(3),GSDMND(3),GSCORAT(3)
0007              INTEGER MANUAL(3)
0008              LOGICAL COVER(3)
0009              DATA HYST/0.005,0.005,0.005/
0010              DATA MATR/1.,.05,.05,.05,1.,.05,.05,.05,1./
0011        C
0012        C     LOOP TO BE EXERCISED FOR EACH OF THE THREE PIT PRESSURE CONTROL
0013        C     SUBSYSTEMS
0014        C
0015              DO 3 I=1,3
0016  0002  C
0017        C     LEAD/LAG ALGORITHM
0018        C
0019  0004        FLEW=GSCORAT(I)*GSDMND(I)
0020              DMPN=.1416E-03*FLEW-.4575E-07*FLEW**2+.7374E-11*FLEW**3
0021        C
0022              IN=ABS(DMPN-PASTDMP(I))
0023              OUT=LDLGCOEF(1)*IN+LDLGCOEF(2)*PSTERR(I)
0024              TEMP=ABS(IN/PSTERR(I))
0025              IF(TEMP.LT.0.100) OUT=0.0
0026  0065        OUT=OUT+LDLGCOEF(3)*LLAGREG(I)
0027              PASTDMP(I)=DMPN
0028              LLAGREG(I)=OUT
0029              PSTERR(I)=IN
0030              FFWD=DMPN+OUT
0031              IF(FFWD.LT.LDLGLMT(1)) FFWD=LDLGLMT(1)
0032  0078        IF(FFWD.GT.LDLGLMT(2)) FFWD=LDLGLMT(2)
0033  00A5        IF(TEMP.LT.0.100) DELRESET=0.0
0034  00AE        IF(DELRESET.EQ.0.0) GO TO 10
0035  00B5        DELRESET=(1.-LDLGCOEF(3)*LLAGREG(I)
0036        C
0037        C     CONTROLLER - VELOCITY ALGORITHM
0038        C
```

```
0039:          10  DELDAMP(I)=0.0
0040:              SETPT =SETPT(I)+ACONST*TOTAIR
0041:              ERR=(PPIT(I)-SETPT)/(4.*DELTEE)
0042:              DD=DMPN
0043: 00C3         GAIN=GAIN(I)*(-0.01855+0.160850*DD+1.527*DD**2)/1.5262
0044:              FACT(I)=GAIN*ERR
0045:              IF(MANUAL(I).EQ.0) GO TO 67
0046: 0126         IF(COVER(I)) GO TO 66
0047: 012C         DELDAMP(I)=0.05-DAMPOSN(I)
0048:              DAMPOSN(I)=0.05
0049:              GO TO 65
0050: 0145     C
0051:          C   MANUAL TRACKING MODE
0052:          C
0053: 0146     67  DELDAMP(I)=HAND(I)-DAMPOSN(I)
0054:              DAMPOSN(I)=HAND(I)
0055: 0167     65  RESET(I)=DAMPOSN(I)-FACT(I)
0056:              LLAGREG(I)=0.0
0057:              GO TO 3
0058: 0188     66  CONTINUE
0059:          C
0060:          C   PROPORTIONAL PLUS RESET CONTROLLER ALGORITHM
0061:          C
0062:              RESET(I)=RFSFT(I)+ERR*DELTEE/RESTM(I)+DELRESET
0063:              TEMP=RESET(I)+FFWD+FACT(I)
0064:              TEMP1=TEMP
0065: 01DF         IF(TEMP.GT.1.0) TEMP=1.0
0066: 01C8         IF(TEMP.LT.0.01) TEMP=0.01
0067: 01CF         IF(TEMP.EQ.TEMP1) GO TO 5
0068: 01E1         RESET(I)=TEMP-FFWD-FACT(I)
0069: 01F5      5  DELDAMP(I)=TEMP-DAMPOSN(I)
0070:           3  CONTINUE
0071:          C
0072:          C   DECOUPLING ALGORITHM
0073:          C
0074: 01FB         DO 20 I=1,3
0075: 01FD         TOT=0.0
0076:              DO 21 J=1,3
```

```
0077    21  TOT=TOT+DEL*DAMP(J)*MATR(I,J)
0078    A   AA=HYST(I)
0079    R   IF(TOT.LT.0.,0) AA=-AA
0080    H   IF((TOT/AA).LT.1.0) AA=0.0
0081    36  DAMPOSN(I)=DAMPOSN(I)+TOT+AA
0082    9   CONTINUE
0083    40  END

PGM SIZE= 0598  POOL SIZE= 0  ERRORS= 0255 VERSION  12  BINARY RECS= 0000
```

I claim:

1. In a control apparatus for a plurality of independent industrial processes, with each said process including a process control member determining the operation of that process and providing a common operationally dependent intercoupling between said processes, the combination of:
    means coupled with each of said processes for independently establishing the operation of the process control member determining the operation of that process,
    means responsive to all of the established operations of the respective process control means for providing decoupled operational changes for the respective process control members, and
    means provided for each process control member and responsive to the decoupled operational change for that process control member determining the operation of the process control member for controlling the industrial process associated with that process control member.

2. The control apparatus of claim 1, with the decoupled operational change providing means determining the interaction of each process in relation to the other processes.

3. The control apparatus of claim 1, with the process control member operation establishing means providing an estimated process control member operational change for each said process, and with the decoupled operational change providing means being responsive to the estimated operational change of each process control member.

4. The control apparatus of claim 1, with the process control member operation determining means being responsive to a hysteresis offset.

5. The control apparatus of claim 1, with said decoupled operational changes being in relation to the positions of said process control members.

6. In a method for controlling a plurality of independent industrial processes with each said process including a process control member determining the operation of that process and providing a common operationally dependent intercoupling between said processes, the steps of
    establishing the respective operations of all of the process control members,
    providing decoupled operational changes for each process control member in response to said established operations of the process control members, and
    determining the operation of each process control member in response to the decoupled operational change for that process control member.

7. The method of claim 6, with the decoupled operational change including the hysteresis effect of the process control member position change.

8. The method of claim 6, with the decoupled operational change being responsive to the intercoupling between the industrial processes.

* * * * *